(12) United States Patent
Kusakabe

(10) Patent No.: US 8,395,806 B2
(45) Date of Patent: Mar. 12, 2013

(54) INFORMATION PROCESSING APPARATUS, METHOD, AND PROGRAM FOR BOOKBINDING WITH SELECTED COVER LAYOUT TYPE

(75) Inventor: Yuki Kusakabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1150 days.

(21) Appl. No.: 11/684,433

(22) Filed: Mar. 9, 2007

(65) Prior Publication Data
US 2007/0229901 A1  Oct. 4, 2007

(30) Foreign Application Priority Data

Apr. 3, 2006 (JP) ................................. 2006-102090

(51) Int. Cl.
*G06K 15/00* (2006.01)
*G06F 3/12* (2006.01)
(52) U.S. Cl. ...................................... 358/1.18; 358/1.15
(58) Field of Classification Search .................... None
See application file for complete search history.

(56) References Cited

U.S. PATENT DOCUMENTS

| | | | | |
|---|---|---|---|---|
| 5,832,193 A | * | 11/1998 | Perine et al. | 358/1.18 |
| 2002/0069228 A1 | * | 6/2002 | Mori et al. | 707/524 |
| 2002/0080405 A1 | * | 6/2002 | Kuroda | 358/1.18 |
| 2003/0099526 A1 | * | 5/2003 | Saw et al. | 412/19 |
| 2004/0098665 A1 | | 5/2004 | Kasahara et al. | |
| 2004/0177336 A1 | * | 9/2004 | Kujirai | 717/104 |

FOREIGN PATENT DOCUMENTS

| | | |
|---|---|---|
| JP | 10-151734 A | 6/1998 |
| JP | 2004-155152 A | 6/2004 |

* cited by examiner

*Primary Examiner* — Fan Zhang
(74) *Attorney, Agent, or Firm* — Canon USA, Inc., I.P. Division

(57) ABSTRACT

An apparatus selects a cover layout type to be used during bookbinding processing from among a plurality of cover layout types, and determines page data to be laid out in a cover area, from among page data included in original data. The apparatus lays out the determined page data in the cover area according to the selected cover layout type, and generates a print job based on the original data and a result of laying out the determined page data in the cover area.

15 Claims, 34 Drawing Sheets

FIG.4

| NO | ATTRIBUTE INFORMATION | | APPLICATION |
|---|---|---|---|
| 1 | PRINT METHOD | ONE-SIDED/TWO-SIDED/BOOKBINDING PRINTING | |
| 2 | PAPER SIZE | ORIGINAL SIZE/FIXED SIZE | • SPECIFY Z-FOLDING WHEN "A4+A3", "B4+B3", OR "LETTER+LEDGER (11×17) IS SPECIFIED<br>• WHEN BOOKBINDING PRINTING OR N-up PRINTING IS SPECIFIED, ORIGINAL SIZE OF THE FIRST CHAPTER OR THE FIRST PAGE IS AUTOMATICALLY SELECTED |
| 3 | PAPER ORIENTATION | PORTRAIT/LANDSCAPE | • SELECTABLE ONLY WHEN FIXED SIZE IS SELECTED |
| 4 | BINDING MARGIN/BINDING DIRECTION | | • SHIFT/ADJUSTMENT CAN BE SPECIFIED |
| 5 | N-up PRINTING | PAGE NUMBER/ARRANGEMENT ORDER/BOUNDARY/ARRANGING POSITION | • DIFFERENT NINE ARRANGEMENT POSITIONS ARE PREPARED<br>• DIRECT-SIZE PRINTING CAN BE SPECIFIED |
| 6 | MAGNIFICATION AND REDUCTION | ON/OFF | • WHEN FIXED SIZE IS SELECTED FOR PAPER SIZE OR WHEN N-up PRINTING IS SELECTED, ON/OFF CAN BE AUTOMATICALLY SPECIFIED |
| 7 | WATERMARK | | • SPECIFICATION CAN BE MADE PER LOGICAL PAGE OR PER PHYSICAL PAGE<br>• WATERMARK IS APPLIED TO ALL CHAPTERS/PAGES |
| 8 | HEADER AND FOOTER | | • SPECIFICATION CAN BE MADE PER LOGICAL PAGE OR PER PHYSICAL PAGE<br>• HEADER/FOOTER ARE APPLIED TO ALL CHAPTERS/PAGES |
| 9 | PAPER DISCHARGE METHOD | STAPLE/PUNCHED HOLE | • STAPLE/PUNCHING ARE APPLIED TO ONE-SIDE PRINTING OR TWO-SIDED PRINTING ONLY<br>• STAPLING CAN BE SPECIFIED FOR ONE HOLE OR TWO HOLES |
| 10 | BOOKBINDING DETAILS | OPENING DIRECTION/SADDLE STITCHING/MAGNIFICATION AND REDUCTION SPECIFICATION/BINDING MARGIN/BOOK SEPARATION SPECIFICATION | • APPLIED ONLY IN THE CASE OF BOOKBINDING PRINTING |
| 11 | COVER/BACK COVER | | • PRINT SPECIFICATION MADE TO COVERS 1 AND 2 AND BACK COVERS 1 AND 2<br>• PAPER FEED PORT (INCLUDING INSERTER) IS SPECIFIED |
| 12 | INDEX PAPER | | • SETTING CAN BE PERFORMED AS TO PRINTING OF TEXT IN INDEX PORTION AND AS TO ANNOTATION ON INDEX PAPER<br>• BOOKBINDING PRINTING CANNOT BE SPECIFIED |
| 13 | SLIP SHEET | | • PAPER FEED PORT (INCLUDING INSERTER) IS SPECIFIED<br>• ORIGINAL DATA CAN BE PRINTED ON INSERTED PAPER<br>• BOOKBINDING PRINTING CANNOT BE SPECIFIED |
| 14 | CHAPTER BREAK | "NONE"/"PAGE BREAK"/"PAPER BREAK" | • WHEN INDEX PAPER OR SLIP SHEET IS SPECIFIED, SPECIFICATION IS FIXED TO "PAPER BREAK"<br>• IN THE CASE OF ONE-SIDED PRINTING, "PAPER BREAK" APPLIES |

FIG.5

| NO | ATTRIBUTE INFORMATION | | APPLICATION |
|---|---|---|---|
| 1 | PAPER SIZE | ORIGINAL SIZE/FIXED SIZE | • WHEN FIXED SIZE IS SELECTED, "PAPER BREAK" IS AUTOMATICALLY SPECIFIED<br>• WHEN PAPERS OF PLURAL DIFFERENT SIZES ARE SPECIFIED IN A BOOK, PAPER SIZE CAN BE CHANGED AMONG PAPERS OF SPECIFIED SIZE, AND PAPER SIZE CAN BE CHANGED WHEN PAPER SIZE IS SPECIFIED ACCORDING TO THE SPECIFICATION IN THE BOOK |
| 2 | PAPER ORIENTATION | PORTRAIT/LANDSCAPE | • SELECTABLE ONLY WHEN FIXED SIZE IS SELECTED |
| 3 | N-up PRINTING | PAGE NUMBER/ ARRANGEMENT ORDER/ BOUNDARY/ ARRANGING POSITION | • DIFFERENT NINE ARRANGEMENT POSITIONS ARE PREPARED<br>• DIRECT-SIZE PRINTING CAN BE SPECIFIED |
| 4 | MAGNIFICATION AND REDUCTION | ON/OFF | • WHEN FIXED SIZE IS SELECTED FOR PAPER SIZE OR WHEN N-up PRINTING IS SELECTED, ON/OFF CAN BE AUTOMATICALLY SPECIFIED |
| 5 | WATERMARK | DISPLAYED/ NOT DISPLAYED | • SPECIFICATION IS MADE CONCERNING WHETHER ALL WATERMARKS SPECIFIED IN THE BOOK ARE DISPLAYED OR NOT |
| 6 | HEADER AND FOOTER | DISPLAYED/ NOT DISPLAYED | • SPECIFICATION IS MADE CONCERNING WHETHER ALL HEADERS AND FOOTERS SPECIFIED IN THE BOOK ARE DISPLAYED OR NOT |
| 7 | PAPER DISCHARGE METHOD | STAPLE | • CAN BE SET TO "OFF" WHEN STAPLE IS SPECIFIED IN THE BOOK. SET TO BE "ON" AS DEFAULT VALUE |

FIG.6

| NO | ATTRIBUTE INFORMATION | | APPLICATION |
|---|---|---|---|
| 1 | PAGE ROTATION SPECIFICATION | | • SPECIFICATION CAN BE SELECTED FROM AMONG 0/90/180/270 DEGREES |
| 2 | WATERMARK | DISPLAYED/ NOT DISPLAYED | • SPECIFICATION IS MADE CONCERNING WHETHER ALL WATERMARKS SPECIFIED IN THE BOOK ARE DISPLAYED OR NOT |
| 3 | HEADER AND FOOTER | DISPLAYED/ NOT DISPLAYED | • SPECIFICATION IS MADE CONCERNING WHETHER ALL HEADERS AND FOOTERS SPECIFIED IN THE BOOK ARE DISPLAYED OR NOT |
| 4 | ZOOM | 50% ~ 200% | • RELATIVE MAGNIFICATION RATE IS SPECIFIED WITH THE SIZE FIT FOR VIRTUAL LOGICAL PAGE AREA AS 100% |
| 5 | ARRANGING POSITION | | • SPECIFIED FROM AMONG NINE FIXED PATTERNS OR SPECIFY ARBITRARY POSITION |
| 6 | ANNOTATION | | |
| 7 | VARIABLE ITEM | | |
| 8 | PAGE BREAK | | |

1501  1502       1503             1504  1505

FINISHING SIZE: F
　FINISHING SIZE WIDTH: Fw
　FINISHING SIZE HEIGHT: Fh

FINISHING SIZE: F
   FINISHING SIZE WIDTH: Fw
   FINISHING SIZE HEIGHT: Fh

SPINE WIDTH: B

SPINE SIZE: S
   SPINE SIZE WIDTH: B
   SPINE SIZE HEIGHT: Fh

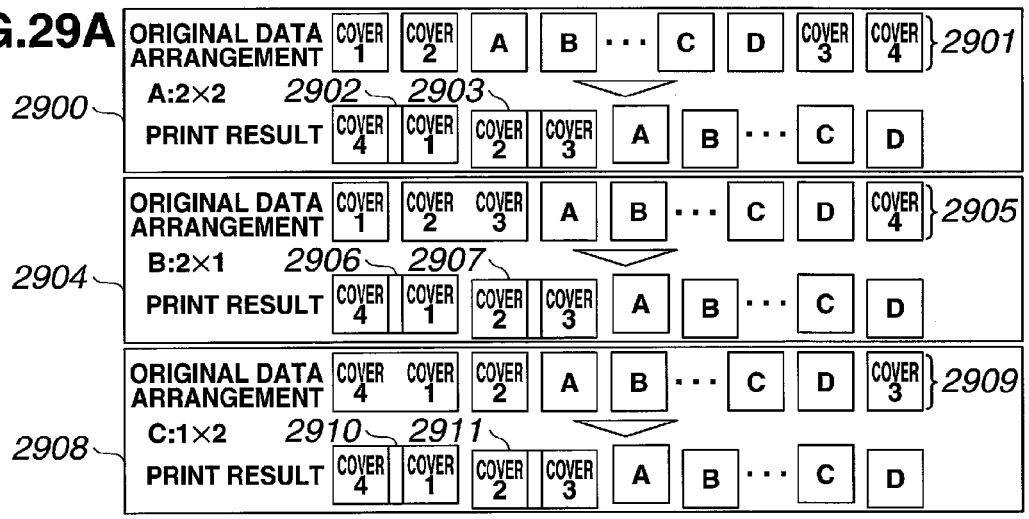
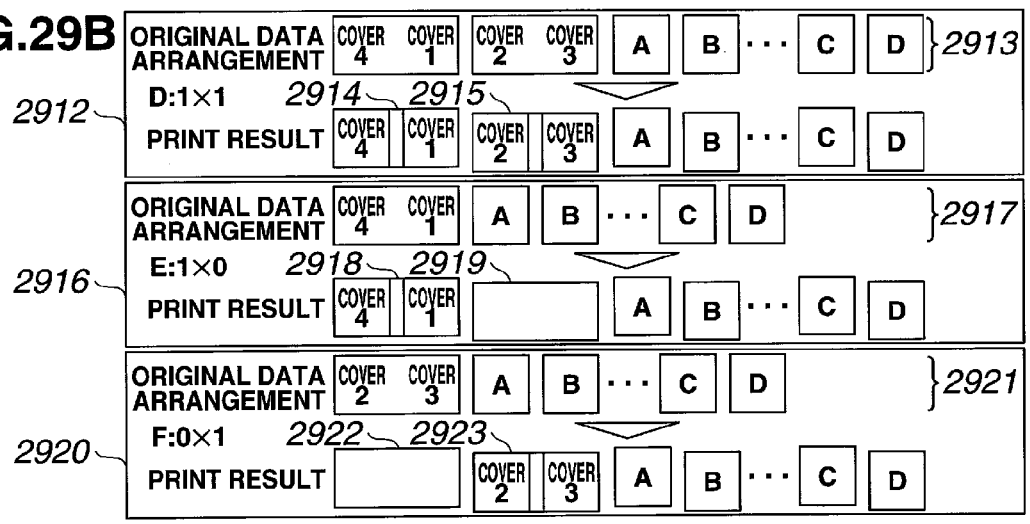
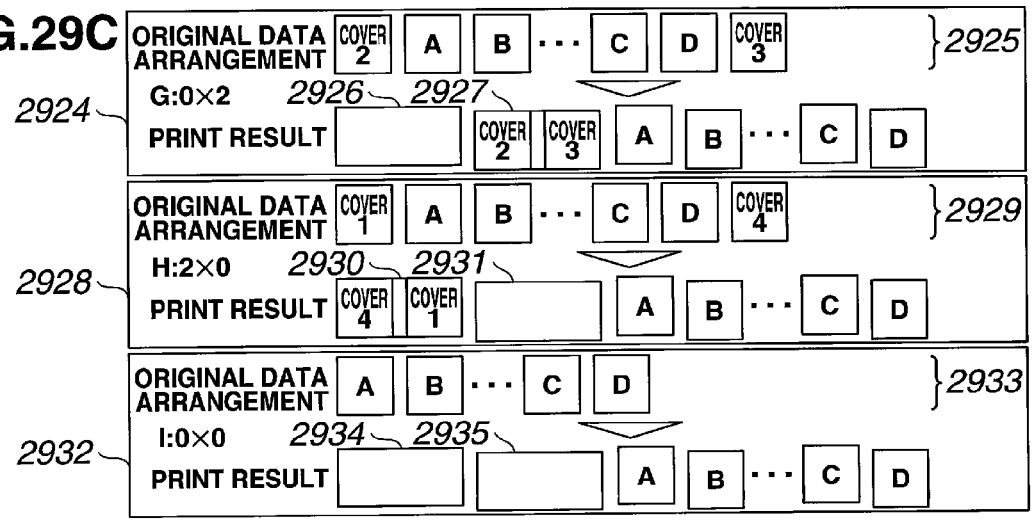

INFORMATION PROCESSING APPARATUS, METHOD, AND PROGRAM FOR BOOKBINDING WITH SELECTED COVER LAYOUT TYPE

BACKGROUND OF THE INVENTION

1. Field of the Invention

The present invention relates to a print control apparatus, a print control method, and a medium used in a document processing system that provides a function for editing document data generated by a document processing program, for example.

2. Description of the Related Art

In recent years, as a speed and an image quality become higher in electrophotographic printing apparatuses and ink jet printing apparatuses, a print on demand (POD) market is growing. Such a POD market can strive to handle a large number of prints and jobs in a short period of time without utilizing a complicated large-scale apparatus or system. Accordingly, the POD market can make the maximum use of a digital image forming apparatus such as a digital copying machine and a digital multifunctional peripheral. In the POD market, digital printing using electronic data is implemented, and a management and a control utilizing a computer have been more widely used than in the conventional printing industry. In the POD market, original data is received from a customer and an output process is performed according to the received original data.

Furthermore, in the POD market, there is a case in which an order is received from a user for producing a book based on original data. In this case, the received original data is output and bookbinding processing is performed as post-printing processing. In this regard, Japanese Patent Application Laid-Open No. 2004-155152 discusses a method for performing processing ranging from image forming to gluing bookbinding with a single image forming apparatus.

Moreover, as one form of performing bookbinding processing, case book binding is known in which bookbinding processing is performed by wrapping an output result of a text with an output result of a cover. In performing case book binding, a cover includes a spine width area. In this regard, Japanese Patent Application Laid-Open No. 10-151734 discusses a method in which a font size or an image is magnified or reduced according to the size of a spine width area to perform drawing processing on a spine.

However, Japanese Patent Application Laid-Open No. 2004-155152 and Japanese Patent Application Laid-Open No. 10-151734 do not discuss any layout processing of a cover.

In addition, in the above-described case book binding, a spine area exists. The size of a spine differs according to original data that is input and, thus, cannot be uniformly determined. More specifically, the spine size varies according to the number of pages of a text and a recording medium that is used. Accordingly, when case book binding is set to be used as bookbinding processing, it is necessary to perform cover layout processing with a spine size taken into consideration. Thus, an operator is required to perform processing for determining a layout of a cover every time original data is input.

Furthermore, in the POD market, output processing is performed according to original data input by a customer, and thus different customers can send different forms of original data. For example, as illustrated in FIG. 29B, original data to which imposition processing for a cover is previously performed as an original data arrangement 2913 can be received. In another case, as illustrated in FIG. 29A, original data to which imposition processing for a cover is not previously performed as an original data arrangement 2901 can be received. In such cases, an operator is required to confirm received original data and to perform output processing without changing the order of page data or to perform processing for changing the order of page data and determining an area in which a page is laid out on a page-by-page basis. Thus, the operator is required to perform different processing depending on original data.

As described above, in a case where case book binding is set as bookbinding processing, an operator is required to spend a lot of labor and time in performing processing for determining a layout of a cover.

SUMMARY OF THE INVENTION

At least one exemplary embodiment of the present invention is directed to a method for efficiently performing layout processing for a cover by determining a layout of a cover based on print setting information that is set and page data that is included in original data.

According to an aspect of the present invention, an embodiment is directed to an information processing apparatus configured to be in communication with a printing apparatus and to generate a print job that can be interpreted by the printing apparatus. The information processing apparatus includes a first setting unit configured to set a cover layout type to be used during output processing from among a plurality of cover layout types so as to perform layout processing on a cover including a spine; a receiving unit configured to receive original data including page data to be printed; a determination unit configured to determine page data to be laid out in a cover area, from among page data included in the original data received by the receiving unit, based on the cover layout type set by the first setting unit; a layout unit configured to lay out the page data determined by the determination unit according to the cover layout type set by the first setting unit; and a first generation unit configured to generate a print job based on the original data and a result of laying out performed by the layout unit.

Further features and aspects of the present invention will become apparent from the following detailed description of exemplary embodiments with reference to the attached drawings.

BRIEF DESCRIPTION OF THE DRAWINGS

The accompanying drawings, which are incorporates in and constitute a part of the specification, illustrate exemplary embodiments, features, and aspects of the invention and, together with the description, serve to explain the principle of the invention.

FIG. 4 illustrates a list of book attributes according to the first exemplary embodiment of the present invention.

FIG. 5 illustrates a list of chapter attributes according to the first exemplary embodiment of the present invention.

FIG. 6 illustrates a list of page attributes according to the first exemplary embodiment of the present invention.

FIGS. 29A through 29C each illustrate an example of processing for determining a cover layout according to the second exemplary embodiment of the present invention.

DETAILED DESCRIPTION OF THE EMBODIMENTS

Various exemplary embodiments, features and aspects of the present invention will now herein be described in detail with reference to the drawings. It is be noted that the relative arrangement of the components, the numerical expressions, and numerical values set forth in these embodiments are not intended to limit the scope of the present invention unless it is specifically stated otherwise.

First Exemplary Embodiment

Outline of System

First, a configuration of a document processing system according to an exemplary embodiment of the present invention is described with reference to FIGS. 1 through 12. The document processing system includes an electronic original writer, which converts a data file generated by a general application into an electronic original file, and a bookbinding application that provides a function for editing the electronic original file. The bookbinding application is capable of generating and editing a document that includes generated data in a lump. Using the bookbinding application, an operability can be improved and editing of a document can be efficiently performed.

<System Configuration and Operation>

Figure 1:
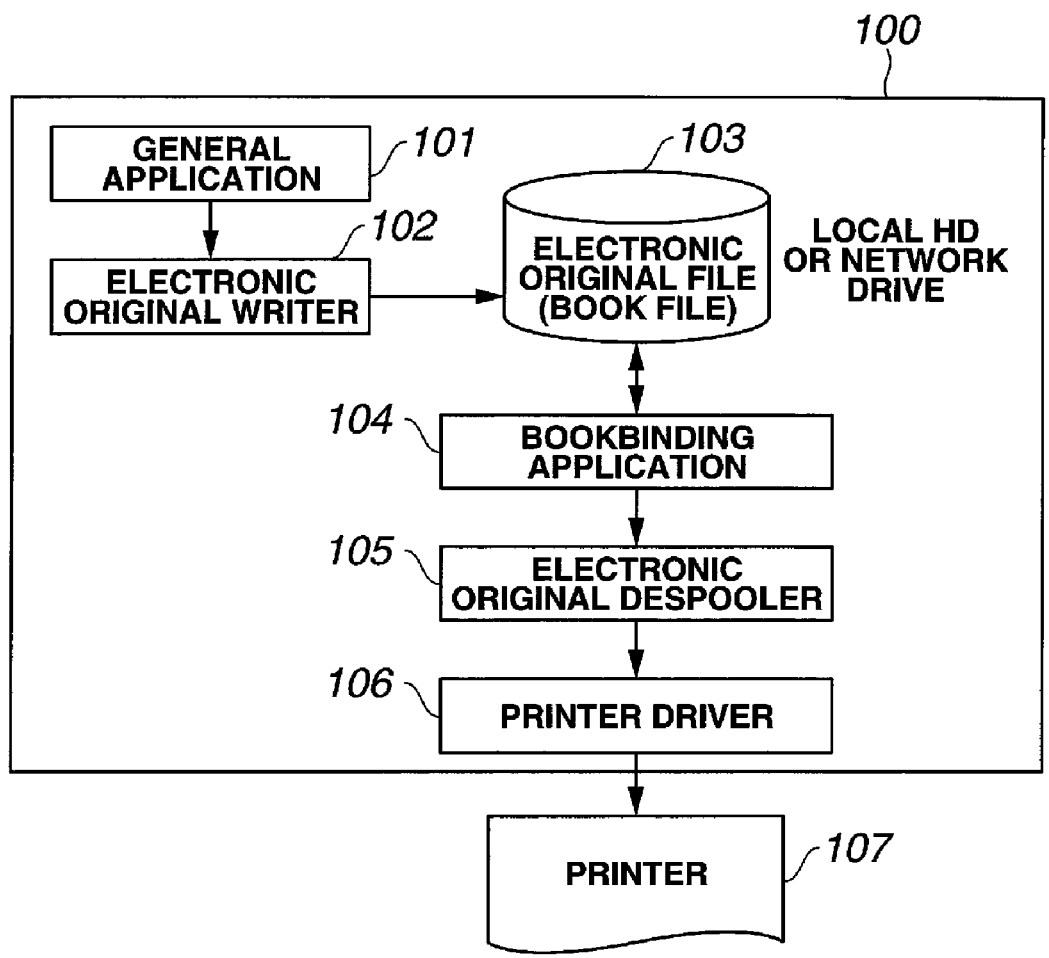
FIG. 1 illustrates an exemplary software configuration of a stand-alone type document processing system according to a first exemplary embodiment of the present invention.

FIG. 1 illustrates an exemplary software configuration of the document processing system according to the present exemplary embodiment. The document processing system is implemented by a digital computer 100. A general application 101 illustrated in FIG. 1 includes an application program that provides various functions. The various functions provided by the general application 101 may include a word processing function, a spreadsheet function, a photo retouching function, a photo drawing function, a photo painting function, a presentation function, and a text editing function. In addition, the general application 101 has a print function used on an operating system (OS).

An application for each of these functions utilizes a given interface provided by an OS (this interface is commonly referred to as a "GDI") in printing application data such as generated document data and image data. That is, the general application 101, in printing generated data, sends an output command, which is dependent on a previously determined OS (this command is called a "GDI function") to an output module of an OS that provides the above-described interface. Meanwhile, the output module, when having received the sent output command, converts the output command into a form in which the output command can be processed by an output device such as a printer, and then outputs the converted command (this command is called a "DDI function").

A form in which the output command can be processed by an output device differs depending on a type, manufacturer, and model of the output device. Accordingly, a device driver is provided for each device. An OS converts the command utilizing the device driver to generate print data and processes the print data with a job language (JL) to generate a print job. When Windows® of Microsoft Corporation is used as an OS, a module called a Graphic Device Interface (GDI) is equivalent to the above-described output module.

An electronic original writer 102 is an improvement of the above-described device driver. The electronic original writer 102 is a software module provided in order to implement the document processing system according to the present exemplary embodiment. However, the electronic original writer 102 is not intended for a specific output device. That is, the electronic original writer 102 converts an output command into a form in which the output command can be processed by a bookbinding application 104 and a printer driver 106.

The form of the output command after the conversion by the electronic original writer 102 (hereinafter referred to as an "electronic original form") can be configured in any form as long as an original in the unit of one page can be represented in a detailed form. Of substantially standard forms, a Portable Document Format (PDF) of Adobe Systems, Inc. and a scalable vector graphics (SVG) format can be employed as an electronic original form.

In allowing the electronic original writer 102 to be utilized from the general application 101, the electronic original writer 102 is specified as a device driver to be used for output before performing printing. However, an electronic original file that is merely generated by the electronic original writer 102 does not have a complete form as an electronic original file.

Accordingly, the bookbinding application 104 specifies the electronic original writer 102 as a device driver. Under control of the bookbinding application 104, application data is converted into an electronic original file. In addition, the bookbinding application 104 completely generates an electronic original file having a form to be described later below based on an incomplete electronic original file newly generated by the electronic original writer 102.

Hereinafter, in a case where it is necessary to clearly describe this, a file generated by the electronic original writer 102 is referred to as an "electronic original file", and an electronic original file that is structured by the bookbinding application 104 is referred to as a "book file". If it is not necessary to especially discriminate between them, each of a document file, an electronic original file, and a book file that are generated by an application is referred to as a "document file" (or "document data").

As described above, the general application 101 specifies the electronic original writer 102 as a device driver to print data. As a result, the electronic original writer 102 converts a form of application data into an electronic original form in the unit of one page defined by the general application 101 (hereinafter referred to as a "logical page" or an "original page"), and stores the converted application data into a storage medium such as a hard disk as an electronic original file 103. Note that the hard disk can be a local drive included in a computer implementing the document processing system according to the present exemplary embodiment. Furthermore, in a case where the document processing system is connected to a network, the hard disk can be a drive provided on a network.

The bookbinding application 104 provides a user with a function for reading and editing an electronic original file (or a book file). However, the bookbinding application 104 does not provide a function for editing a content of each page. The bookbinding application 104 provides a function for editing a structure of a chapter and a book constituted with one page as a minimum unit.

In printing the electronic original file 103 edited by the bookbinding application 104, an electronic original despooler 105 is activated by the bookbinding application 104. The electronic original despooler 105 is a program module installed in a computer together with the bookbinding application 104. The electronic original despooler 105 is a module used for outputting drawing data to the printer driver 106 in printing a document (book file) utilized by the bookbinding application 104.

The electronic original despooler 105 reads a specified book file from the hard disk and in order to print each page in a form described in the book file, generates an output command suitable to an output module of the OS, and then outputs the generated output command to an output module (not shown). At this time, the printer driver 106 for a printer 107 used as an output device is specified as a device driver.

The output module converts the received output command into a device command and outputs the device command to the specified printer driver 106 for the printer 107. Then, the printer driver 106 converts the received device command into a command in a page description language that can be interpreted by the printer 107. The converted command is sent from the printer driver 106 to the printer 107 via a system spooler (not shown). Then, the printer 107 prints an image according to the received command.

Figure 2:
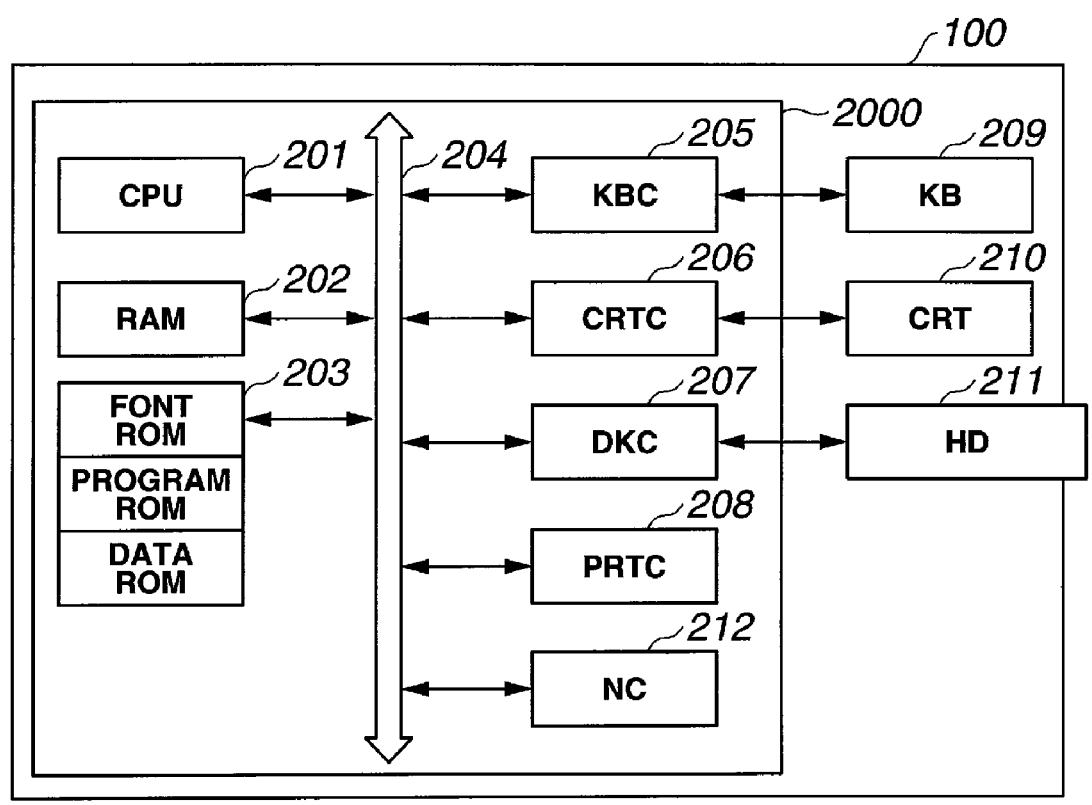
FIG. 2 illustrates an exemplary hardware configuration for implementing the document processing system according to the first exemplary embodiment of the present invention.

FIG. 2 illustrates an exemplary hardware configuration of the digital computer 100. Referring to FIG. 2, a central processing unit (CPU) 201 executes an OS and a program for a general application and a bookbinding application, which are loaded from a read only memory (ROM) 203 or a hard disk 211 to a random access memory (RAM) 202 to implement a software configuration illustrated in FIG. 1 and processing illustrated in flow charts to be described later below. The RAM 202 functions as a main memory and a work area of the CPU 201. A keyboard controller (KBC) 205 controls a key input via a keyboard 209 and a pointing device (not shown).

A cathode ray tube controller (CRTC) 206 controls a display on a CRT display 210. A disk controller (DKC) 207 controls an access to and from the hard disk (HD) 211 and a floppy disk (FD) storing a boot program, various kinds of applications, font data, a user file, and an editing file, which is to be described later below. A printer controller (PRTC) 208 controls transmission and reception of signals with the printer 107 connected to the digital computer 100. A network controller (NC) 212 is connected to a network to perform processing for controlling a communication with another apparatus connected to the network.

<Form of Electronic Original Data>

Before describing the bookbinding application 104 in detail, a form of data in a book file is described. A book file includes a layer structure of three layers, which imitates a book made of a paper medium. First, a top layer is called a "book", which imitates one book. In the top layer, an attribute as to the entire book is defined. In an intermediate layer, which exists just below the top layer, is equivalent to a chapter in a paper book, and is called a "chapter". In each chapter, an attribute for each chapter can be defined. A bottom layer is called a "page", and is equivalent to each page defined by an application program. In each page, an attribute for each page can be defined. Furthermore, one book can include a plurality of chapters, and one chapter can include a plurality of pages.

Figure 3A:
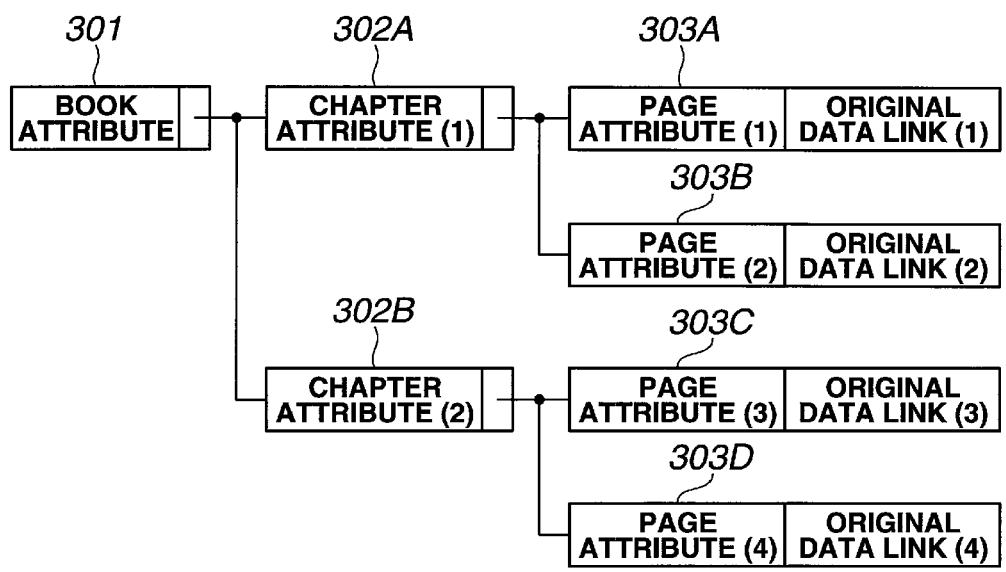
FIG. 3A and FIG. 3B illustrate an exemplary configuration of a book file according to the first exemplary embodiment of the present invention.

FIG. 3A schematically illustrates an example of a form of a book file. As illustrated in FIG. 3A, in this example, each of a book, a chapter, and a page in the book file is indicated by a node that is equivalent thereto. One book file includes one book. Each of a book and a chapter defines a structure of a book, and accordingly, includes a value for a defined attribute and a link to the bottom layer, as its substance. A page includes, as its substance, data of each page output by an application program. Accordingly, a page includes, in addition to the attribute value, a substance of an original page (original page data) and a link to each original page data.

Note that there is a case where a print page that is output onto a paper medium includes a plurality of original pages. A structure in this case is not displayed by a link and is displayed as an attribute in each layer of a book, a chapter, and a page.

Figure 3B:

FIG. 3A illustrates an example of a structure of a book file. Referring to FIG. 3A, in a book 301, a book attribute is defined and two chapters 302A and 302B are linked thereto. The link indicates that the book 301 includes the chapters 302A and 302B. To the chapter 302A, pages 303A and 303B are linked, and it is indicated that the chapter 302A includes the pages 303A and 303B. In each of the pages 303A and 303B, an attribute value for each of the pages 303A and 303B is defined. Furthermore, each of the pages 303A and 303B includes a link to original page data (1) and (2), which is a substance of the pages 303A and 303B. Each link indicates each of data (1) and (2) of original page data 304 as illustrated in FIG. 3B, and indicates that the substance of each of the pages 303A and 303B is each of the original page data (1) and (2).

FIG. 4 illustrates a list of book attributes. For an item that can be defined overlapping with the bottom layer, an attribute value for the bottom layer is used in priority. Accordingly, with respect to an item included in the book attribute only, the value defined in the book attribute becomes effective for the entire book. However, the item overlapping with the bottom layer has a significance as a default value in the case where the item is not defined in the bottom layer. Note that each items illustrated in FIG. 4 does not specifically correspond to one item, and can include a plurality of related items.

FIG. 5 illustrates a list of chapter attributes. FIG. 6 illustrates a list of page attributes. The relationship between a chapter attribute and a page attribute is similar to the relationship between a book attribute and an attribute in the bottom layer.

As seen by referring to FIGS. 4 through 6, items unique to the book attribute include six items, namely, a print method, details of bookbinding, front and back covers, an index paper, an inserted sheet, and a chapter break. These items are defined through the book. As an attribute for the print method, three values, namely, one-sided printing, two-sided printing, and bookbinding printing can be specified. Here, the bookbinding printing is a method in which a specified number of papers are bundled and folded in two and printing is performed in a form in which bookbinding can be performed by binding and stitching the bundle. For a detailed bookbinding attribute, when bookbinding printing is specified, a specification can be performed as to a direction of a center-spread page and a number of pages to be bundled.

A front/back cover attribute includes a specification as to addition of sheets used for front and back covers in printing of an electronic original file that is bound as a book and a specification as to a content of printing on the added sheet. An index paper attribute includes a specification for inserting an index paper having a lug, which is separately provided to a print apparatus, as a chapter break, and a specification as to a content of printing in an index (lug) portion. This attribute becomes effective when an inserter, which has an insertion function for inserting a sheet that is provided separately from a print sheet at a desired position, is provided to a printing apparatus to be used or when a plurality of paper feed cassettes can be used. The same applies to a inserted sheet attribute.

A inserted sheet attribute includes a specification as to an insertion of a sheet supplied from an inserter or a paper feed cassette as a chapter break and, in a case where a inserted sheet is inserted, a specification as to a paper feed source.

A chapter break attribute includes a specification as to whether a new sheet is used, whether a new print page is used, or whether nothing is specially done, at a chapter break. In the case of one-sided printing, the use of a new sheet and the use of a new print page have a similar significance. In the case of two-sided printing, when "the use of a new sheet" is specified, continuous plural chapters are not printed onto one sheet. However, when "the use of a new print page" is specified, continuous plural chapters can be printed onto one sheet.

For a chapter attribute, there is no item unique to a chapter, and all the items overlap with the items for the book attribute. Accordingly, in the case where a definition in a chapter attribute and a definition in a book attribute differ from each other, a value defined in the chapter attribute is used in priority. Items in common only to the book attribute and the chapter attribute include five items, namely, a paper size, a paper orientation, a specification for N-up printing, magnification and reduction, and a discharge method.

Of these items, the N-up printing specification attribute is an item for specifying the number of original pages included in one print page. N-up printing that can be specified includes 1×1, 1×2, 2×2, 3×3, and 4×4, for example. The discharge method attribute is an item for specifying whether stapling processing is performed on discharged sheets. Whether the discharge method attribute is effective or not depends on whether a printing apparatus to be used includes a stapling function.

Items unique to the page attribute include a page rotation attribute, a zoom, a specification as to imposition, an annotation, and page break. The page rotation attribute is an item for specifying a rotational angle for disposing an original page in a print page. The zoom attribute is an item for specifying a magnification rate of an original page. The magnification rate is specified with a size of a virtual logical page area as 100%. The virtual logical page area is an area that one original page occupies when an original page is arranged according to a specification as to N-up printing and the like. For example, when "1×1" is specified for the N-up printing, the virtual logical page area is equivalent to one print page. When "1×2" is specified for the N-up printing, the virtual logical page area is equivalent to an area determined by reducing each side of one print page to 70% thereof.

Attributes common to the book, the chapter, and the page include a watermark attribute and a header and footer attribute. Here, a watermark includes an image and a character string, which are separately specified, and is printed in overlap with data generated by an application. The header and footer attribute is a watermark printed in a top margin or in a bottom margin of each page. However, to the header and the footer attribute, an item that can be specified using a variable such as a page number and a date and time is provided.

In an embodiment, the content that can be specified in the watermark attribute and the header and footer attribute is in common to the chapter attribute and the page attribute. However, the content that can be specified in the watermark attribute and the header and footer attribute is different therefrom with respect to the book attribute. In the book attribute, the content of the watermark attribute and the header and footer attribute can be set. In addition, in the book attribute, specification can be performed as to how a watermark, a header, or a footer is printed through the entire book. Meanwhile, in the chapter attribute and the page attribute, a specification can be performed as to whether in a corresponding chapter and a corresponding page, a watermark, a header, or a footer, which is set in the book attribute, is to be printed.

<Processing for Generating a Book File>

A book file has the structure and content described above. Now, processing for generating a book file performed by the bookbinding application 104 and the electronic original writer 102 is described. The processing for generating a book file is implemented as a part of an operation for editing a book file performed by the bookbinding application 104.

Figure 7:
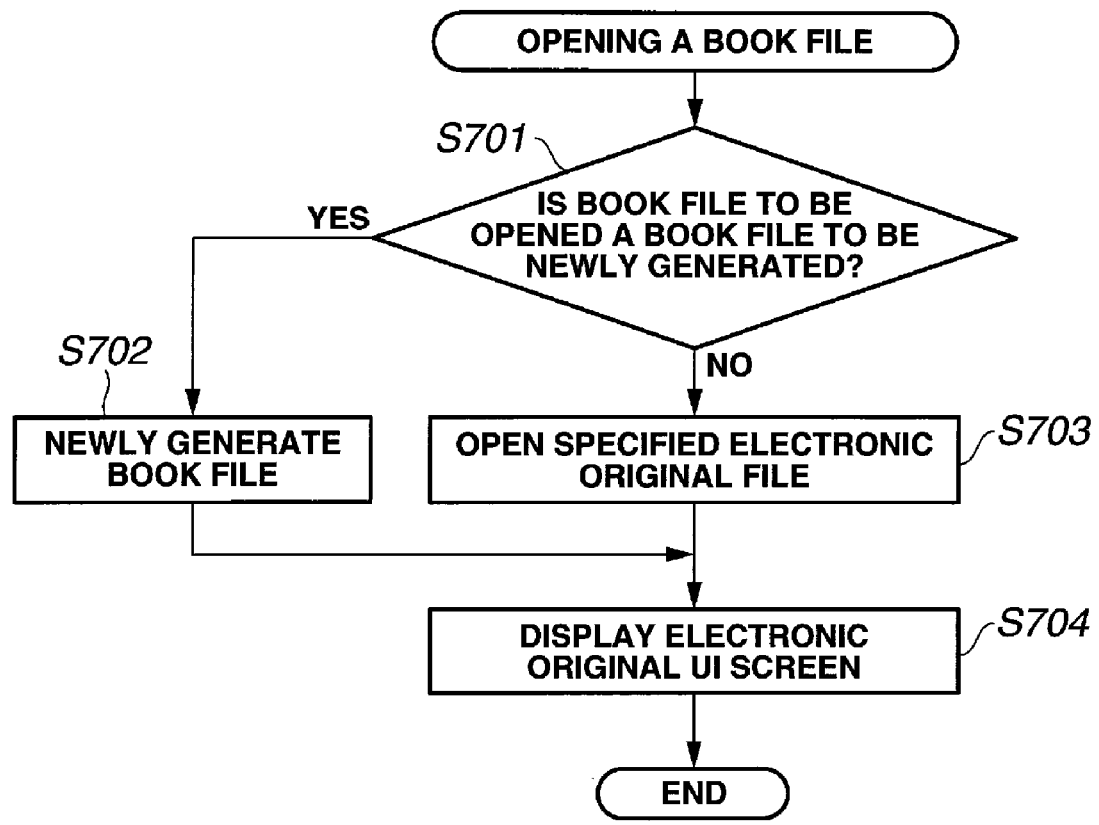
FIG. 7 is a flow chart illustrating an exemplary flow of processing for opening a book file according to the first exemplary embodiment of the present invention.

FIG. 7 is a flow chart illustrating an exemplary flow of processing for opening a book file performed by the bookbinding application 104. In an embodiment, each step in the flow charts of the exemplary embodiments of the present invention is performed by the CPU 201 of the digital computer 100.

Referring to FIG. 7, first, in step S701, the bookbinding application 104 determines whether a book file to be opened is either a book file to be newly generated or an existing book file. If it is determined by the bookbinding application 104 in step S701 that the book file to be opened is a book file to be newly generated (YES in step S701), then the processing proceeds to step S702 in which the bookbinding application 104 newly generates a book file that does not include a chapter.

Figure 11:
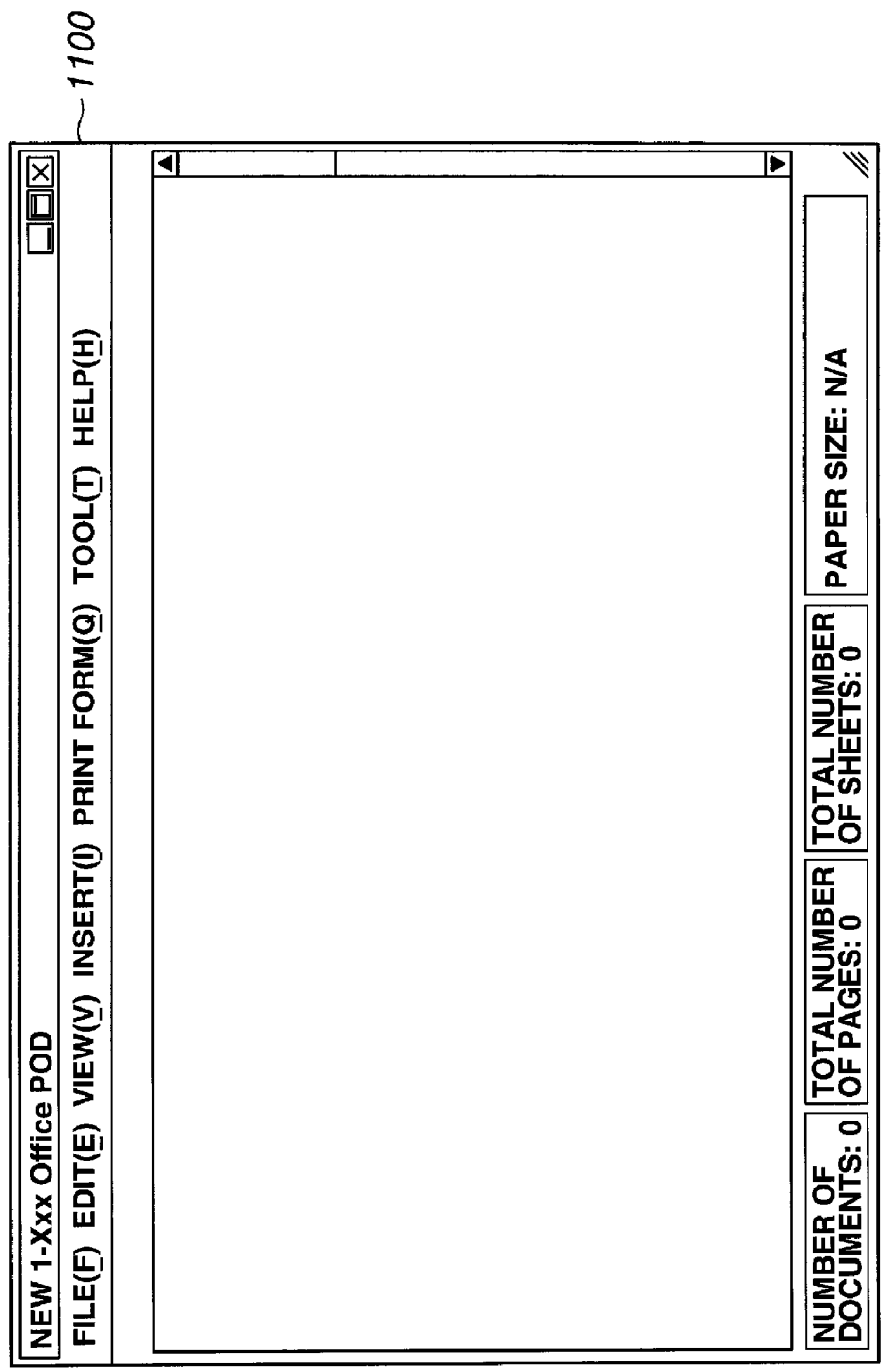
FIG. 11 illustrates an example of a user interface screen displayed when a new book file is opened according to the first exemplary embodiment of the present invention.

As shown in the example illustrated in FIG. 3A, the book file to be newly generated includes a book node 301 only, and becomes a node of a book in which no link to a node in a chapter exists. To the book attribute, a set of attributes that is previously prepared for newly generating a book file is applied. Then, in step S704, the bookbinding application 104 displays a user interface (UI) screen for editing the new book file. FIG. 11 illustrates an example of the UI screen displayed when a book file is newly generated. In this case, a UI screen 1110 does not display any content because the new book file does not have a substantial content.

On the other hand, if it is determined in step S701 that the book file to be opened is an existing book file (NO in step S701), then the processing proceeds to step S703 in which the bookbinding application 104 opens the specified book file and displays a UI screen according to a structure, attribute, and content of the opened book file.

Figure 10:
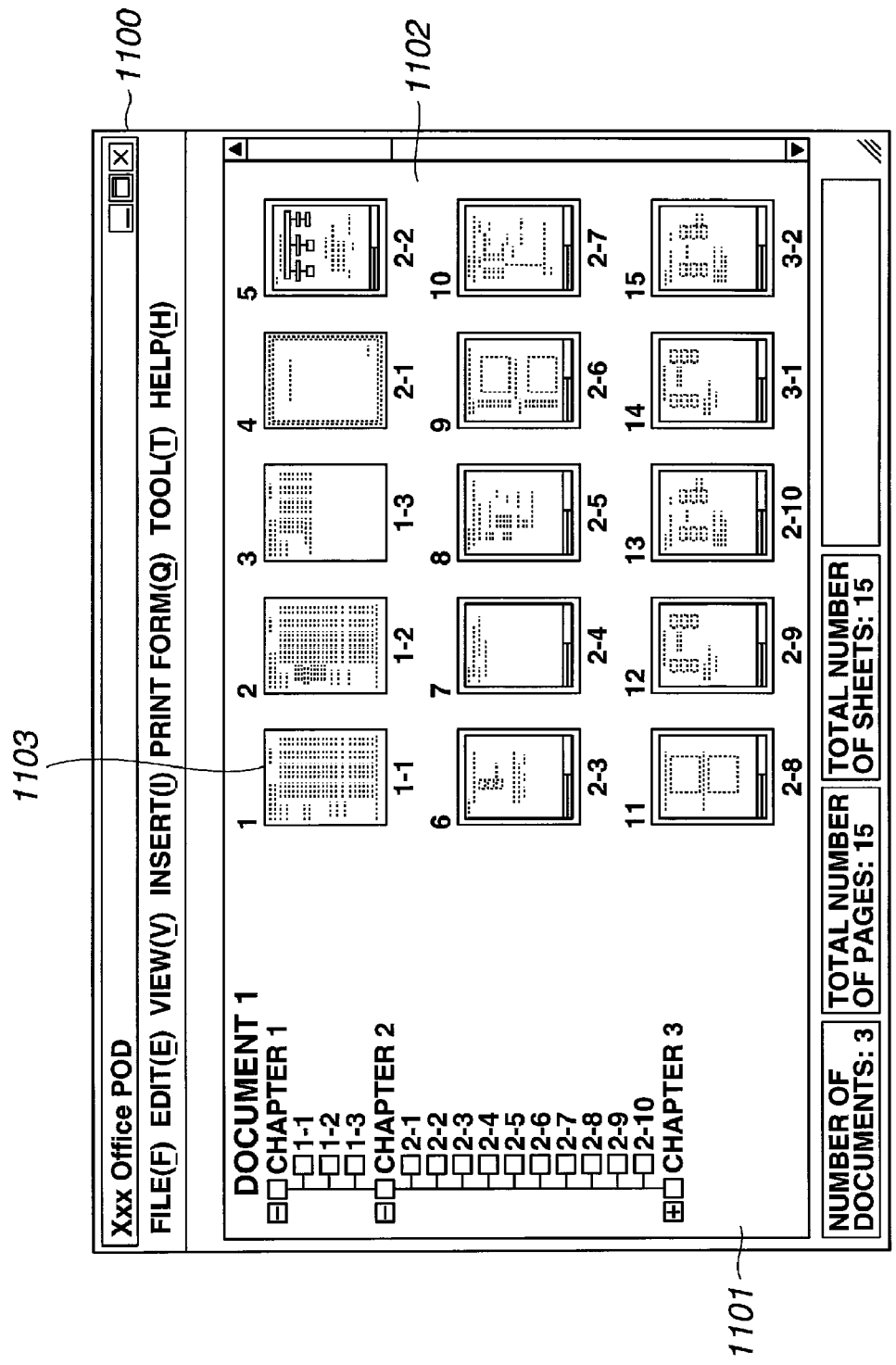
FIG. 10 illustrates an example of a user interface screen displayed when an existing book file is opened according to the first exemplary embodiment of the present invention.

FIG. 10 illustrates an example of a UI screen that displays a book file specified from among existing book files. The UI screen 1100 includes a tree portion 1101 that indicates a structure of a book and a preview portion 1102 in which a state after printing is displayed. In the tree portion 1101, chapters included in the book and pages included in each chapter are displayed in a tree structure as illustrated in FIG. 3A. The pages displayed in the tree portion 1101 are original pages. In addition, in the preview portion 1102, a content of a print page is displayed in a reduced state. The structure of the book is reflected in the order of displaying the chapters and the pages.

Here, in the opened book file, application data, which is converted into an electronic original file by the electronic original writer 102, can be added as a new chapter. This function is called an electronic original importing function. When electronic original importing is performed on the book file newly generated according to the processing illustrated in FIG. 7, the book file is provided with a substance. This function is activated by drag-and-dropping the application data onto a screen illustrated in FIG. 10.

Figure 8:
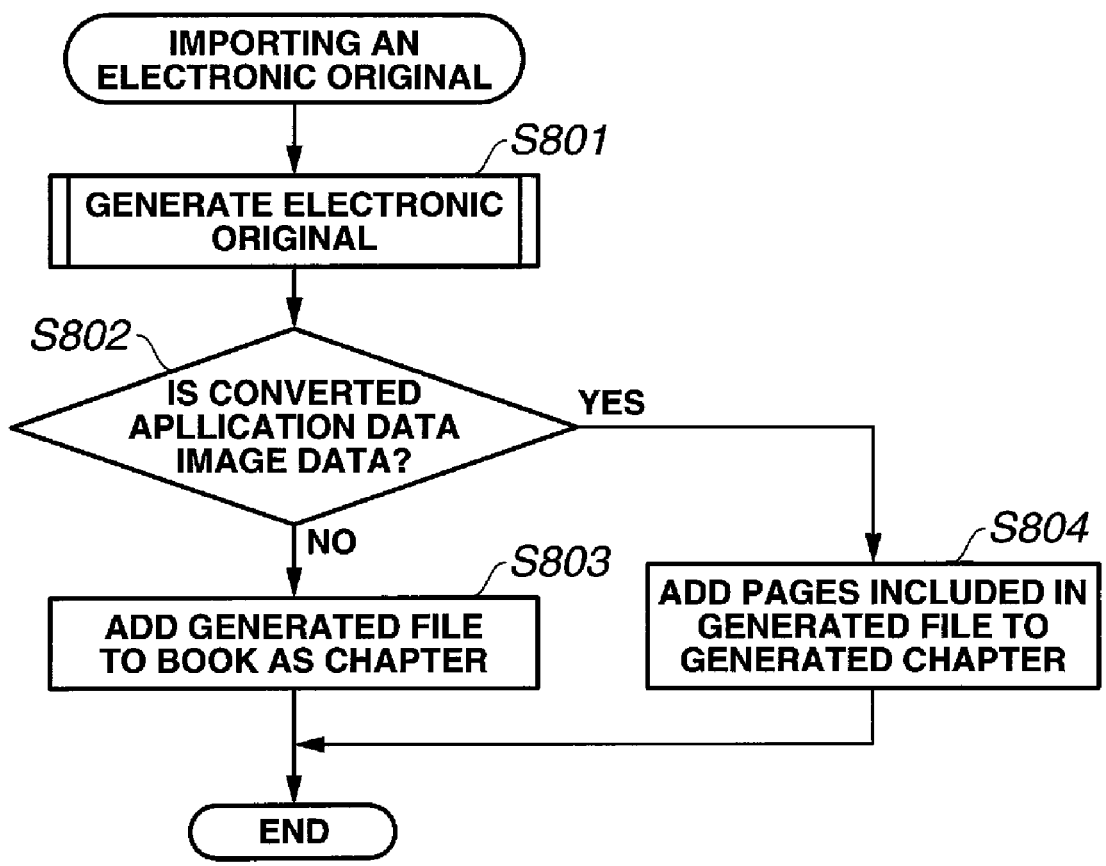
FIG. 8 is a flow chart illustrating an exemplary flow of processing for importing an electronic original according to the first exemplary embodiment of the present invention.

FIG. 8 is a flow chart illustrating an exemplary flow of electronic original importing processing. Referring to FIG. 8, first, the bookbinding application 104 activates an application program that has generated specified application data. In step S801, the bookbinding application 104 converts the application data into electronic original data by specifying the electronic original writer 102 as a device driver and performing a printing process on the application data. After the conversion is completed, in step S802, the bookbinding application 104 determines whether the converted application data is image data.

This determination is, in the case of using a Windows® OS, performed according to a file extension of the application data. For example, if the file extension is "bmp", the application is determined as Windows® bitmap data. If the file extension is "jpg", the application data is determined as JPEG-compressed image data. Furthermore, if the file extension is "tiff", the application data is determined to be image data having a Tag Image File format (TIFF). In the case where the application data is image data, the processing in step S801 can be omitted because an electronic original file can be generated directly from image data without activating an application in step S801.

Here, if it is determined in step S802 that the converted application data is not image data (NO in step S802), then the processing proceeds to step S803 in which the bookbinding application 104 adds the electronic original file generated in step S801 to the book of the book file that is currently opened as a new chapter. For the chapter attribute thereof, with respect to that in common with the book attribute, the value for the book attribute is copied to be used as a chapter attribute. The chapter attribute that is not in common with the book attribute is set to a default value that is previously provided.

On the other hand, if it is determined in step S802 that the converted application data is image data (YES in step S802), then the processing proceeds to step S804 in which the bookbinding application 104, in principle, does not add a new chapter, and instead thereof, adds each original page included in the electronic original file generated in step S801 to the specified chapter. However, if the book file is a newly generated book file, the bookbinding application 104 generates a new chapter, and then adds each page of an electronic original file to the new chapter as a page included in the newly generated chapter.

With respect to the page attribute, those in common with the attribute in the top layer are provided with an attribute value in the top layer. With respect to the page attribute in which an attribute defined in the application data is transferred to an electronic original file, the value defined in the application data is provided. For example, in the case where an N-up printing specification is made in the application data, an attribute value thereof is transferred. Thus, the bookbinding application 104 generates a new book file or adds a new chapter.

Figure 9:
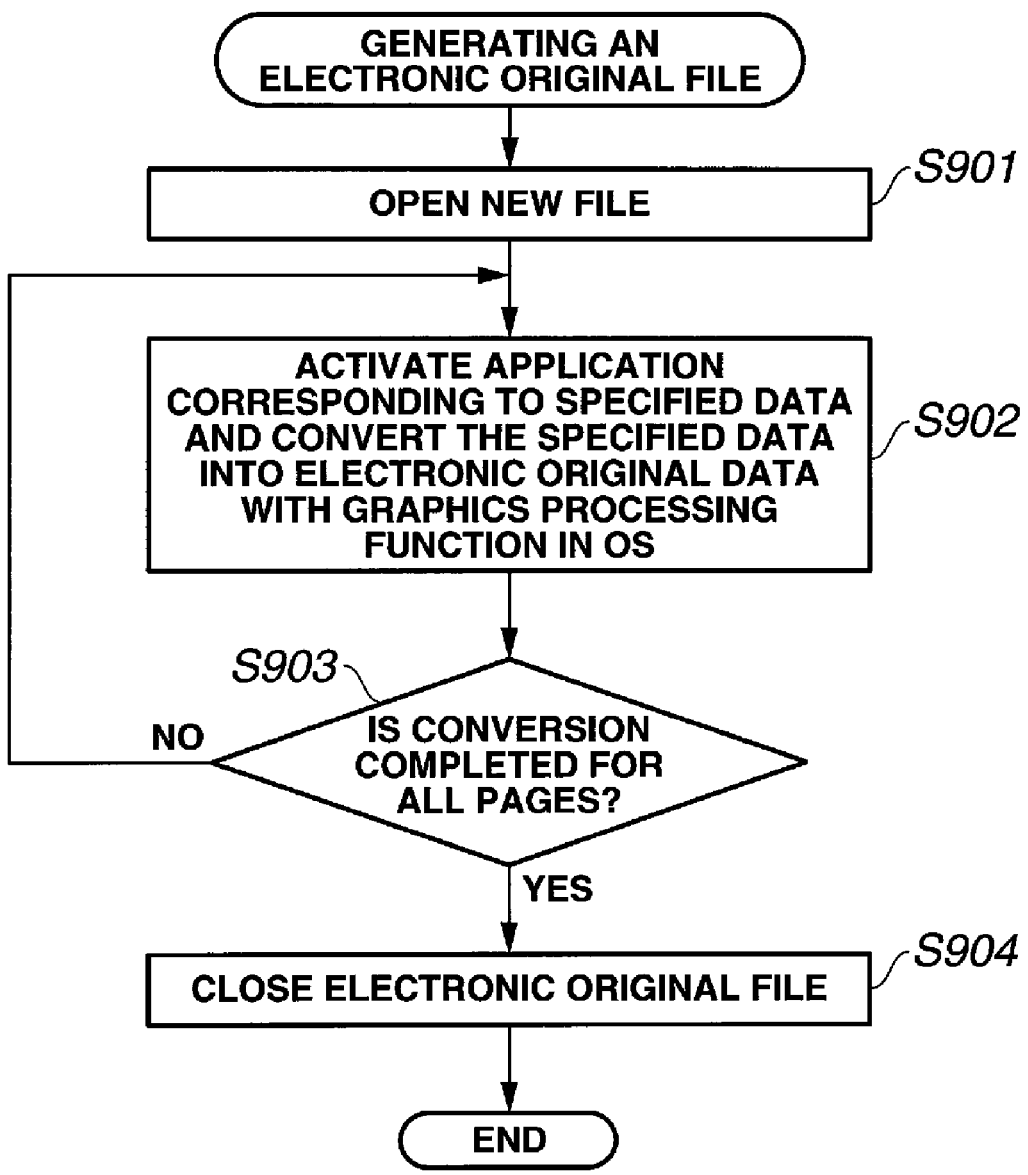
FIG. 9 is a flow chart illustrating an exemplary flow of processing for generating an electronic original file according to the first exemplary embodiment of the present invention.

FIG. 9 is a flow chart illustrating an exemplary flow of processing for generating an electronic original file by the electronic original writer 102 in step S801 illustrated in FIG. 8. Referring to FIG. 9, first, in step S901, the bookbinding application 104 generates a new electronic original file and opens the newly generated electronic original file.

In step S902, the bookbinding application 104 activates an application corresponding to the specified application data, and then outputs an output command to an output module of the OS with the electronic original writer 102 as a device driver. The output module converts the received output command into electronic original data using the electronic original writer 102, and then outputs the converted data. A destination of the output is the electronic original file that is opened in step S901. In step S903, the bookbinding application 104 determines whether the conversion is completed for all the specified data. If it is determined in step S903 that the conversion is completed for all the specified data (YES in step S903), then the processing proceeds to step S904 in which the bookbinding application 104 closes the electronic original file. The electronic original file generated by the electronic original writer 102 is a file that includes a substance of original page data illustrated in FIG. 3B.

<Editing of Book File>

As described above, a book file can be generated based on application data. With respect to the generated book file, the following editing operations can be performed on a chapter and a page of the book file.

(1) Add a new chapter (or page)
(2) Delete
(3) Copy
(4) Cut
(5) Paste
(6) Move
(7) Change a chapter name
(8) Rename page number name
(9) Insert a cover
(10) Insert a slip sheet (inserted sheet)
(11) Insert an index sheet
(12) Provide a page layout to each original page In addition, an operation for canceling an editing operation that is already started and an operation for performing again the operation that is already cancelled can be performed. With these editing functions, editing operations can be performed such as combining a plurality of book files, rearranging chapters and pages in a book file, deleting a chapter or a page in a book file, changing a layout of an original page, and insertion of an inserted sheet or an index sheet. By performing these operations, a result of the operation can be reflected to the attributes illustrated in FIG. 4 and FIG. 5 or to a structure of a book file.

For example, when an operation for newly adding a blank page is performed, a blank page is inserted in a specified position. The inserted blank page is handled as an original page. In addition, by changing a layout of an original page, the content of the change is reflected to the attributes such as the print method attribute, the N-up printing attribute, the front/back covers attribute, the index paper attribute, the inserted sheet attribute, and the chapter break attribute.

<Output of a Book File>

The book file, which is generated and edited as described above, is intended to be finally printed out. Here, when a user selects a file menu via the UI screen 1100 in the bookbinding application 104 and selects printing, the book file is printed out by a specified output device. In performing the printing processing, first, the bookbinding application 104 generates a job ticket based on the book file that is currently opened, and then transfers the generated job ticket to the electronic original despooler 105.

The electronic original despooler 105 converts the received job ticket into an output command of the OS (for example, into a GDI function in Windows®), and then transfers the output command to an output module (for example, to a GDI). The output module, which has received the output command, generates a command suitable to the output device using the specified printer driver 106, and then sends the generated command to the output device.

Here, a job ticket is data having a structure using an original page as a minimum unit. The structure of a job ticket defines a layout of an original page on a sheet. One job ticket is issued per one job. Accordingly, a document node primarily exists in a top portion of a job ticket, and in this portion, an attribute for the entire document is defined such as an attribute for two-sided printing or one-sided printing. Just below the document node, a paper node exists, which includes an identifier of a paper to be used and a specification as to a paper discharge port in a printer.

Each paper node includes a node of a sheet printed using the paper. One sheet is equivalent to one paper. Each sheet includes a print page (physical page). In the case of one-sided printing, one sheet includes one physical page. In the case of two-sided printing, one sheet includes two physical pages. Each physical page includes an original page that is disposed thereon. In addition, as an attribute for a physical page, a layout of an original page is included in each physical page.

The electronic original despooler 105 converts the above-described job ticket into an output command to be sent to an output module.

<Other System Configurations>

The outline of the document processing system according to the present exemplary embodiment is as described above. The document processing system described above is a stand-alone type system. However, in a server-client system, which is an expansion of the stand-alone system, a book file can be generated and edited with a substantially similar configuration and processing. However, in this case, a book file and print processing are managed by a server apparatus.

Figure 12:
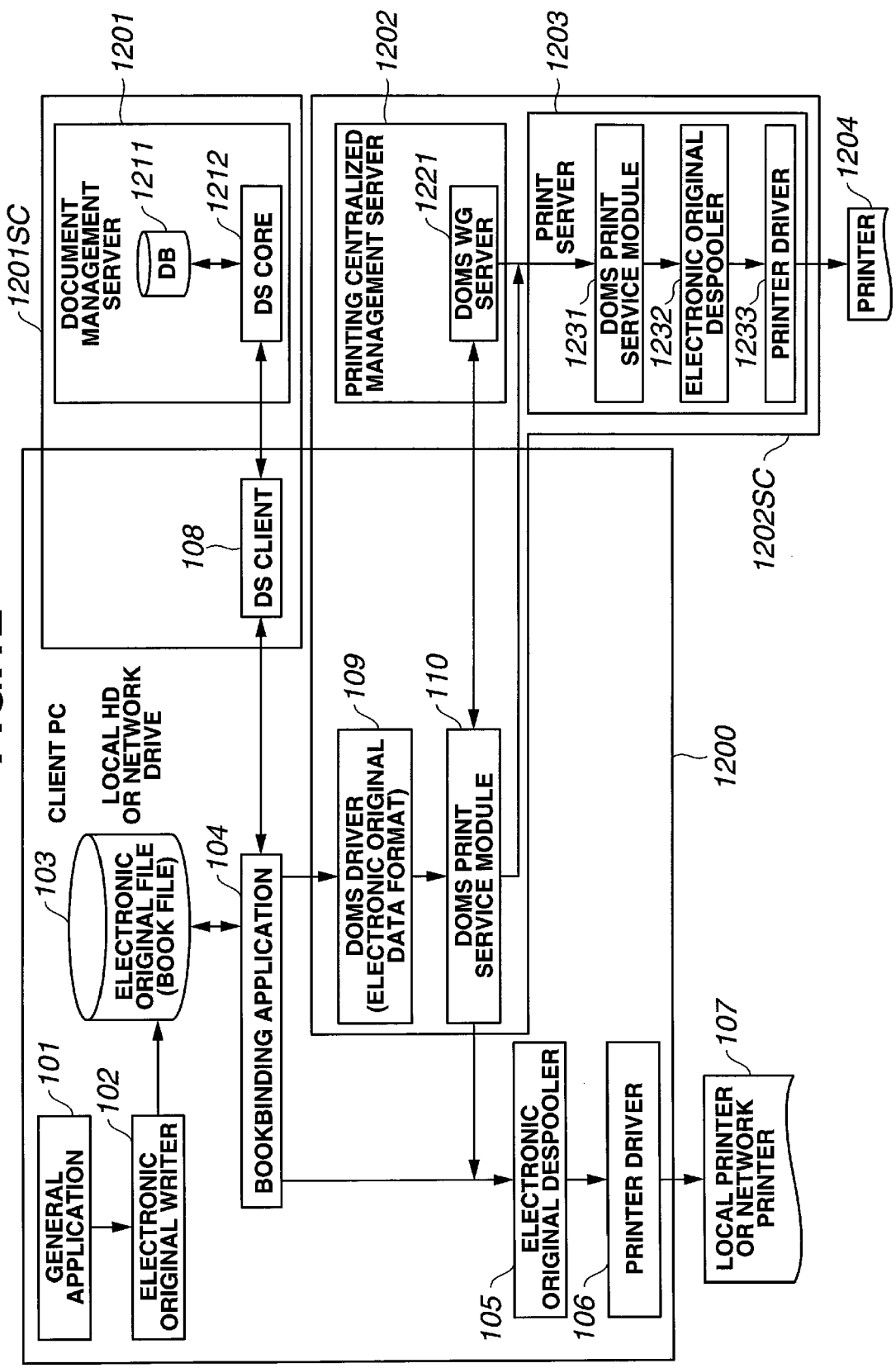
FIG. 12 illustrates an exemplary software configuration of a client-server type document processing system according to the first exemplary embodiment of the present invention.

FIG. 12 illustrates an exemplary configuration of a server-client type document processing system. A client document processing system 1200 has a configuration in which a document output management service (DOMS) driver 109, which is a client module, a DOMS print service module 110, and a document service (DS) client module 108 are added to the configuration of the stand-alone document processing system. To the client document processing system 1200, a document management server 1201, a printing centralized management server 1202, and a print server 1203 are connected. The document management server 1201, the printing centralized management server 1202, and the print server 1203 are connected to the document management server 1201 via an ordinary network. In the case of a system in which a server functions as a client at the same time, the document management server 1201, the printing centralized management server 1202, and the print server 1203 are connected via an inter-process communication in which a communication between networks is simulated.

In the example illustrated in FIG. 12, both the printing centralized management server 1202 and the print server 1203 are connected to a client personal computer (PC). However, the configuration is not limited to this. That is, the configuration can be arranged such that one of the printing centralized management server 1202 and the print server 1203 only exists on a network.

The document management server 1201 is a server that stores a book file generated and edited by the bookbinding application 104. In the case of managing a book file with the document management server 1201, the book file is stored in a database 1211 of the document management server 1201, instead of or in addition to a local HD in a client PC. Storing and reading of a book file performed between the bookbinding application 104 and the document management server 1201 are performed via the DS client 108 and a DS core 1212.

The printing centralized management server 1202 is a server that manages printing of a book file stored in the client document processing system 1200 or in the document management server 1201. A print request generated by the client PC is sent to a DOMS WG server module 1221 of the printing centralized management server 1202 via the DOMS driver 109 and the DOMS print service module 110. The printing centralized management server 1202, in the case where printing is performed by a printer connected to the client PC, transfers electronic original data to the electronic original despooler 105 via the DOMS print service module 110.

Meanwhile, in the case where printing is performed by the print server 1203, the printing centralized management server 1202 sends electronic original data to the DOMS print service module 1231 of the print server 1203. The printing centralized management server 1202 performs security checking concerning an authority of a user who has generated a print request of the stored book file and stores a log file of the print processing, for example. As described above, the document processing system can be implemented in a stand-alone system or in a client-server system.

<Content of Preview Display>

As described above, when a book file is opened by the bookbinding application 104, the UI screen 1100 illustrated in FIG. 10 is displayed. In the tree portion 1101, a tree indicating a structure of the opened book (hereinafter referred to as a "target book") is displayed. In the preview portion 1102, three display methods are provided according to a specification by a user. First, a mode called an original view, in which an original page is displayed as it is, is provided. In the original view mode, a content of the original page included in the target book is displayed in a reduced state. Note that a layout is not reflected to the display in the preview portion 1102.

Secondly, a print view mode is provided. In the print view mode, an original page is displayed in the preview portion 1102 in a state in which a layout of an original page is reflected.

Thirdly, a simple print view mode is provided. In the simple print view mode, a content of each original page is not reflected in the display in the preview portion 1102, and only the layout of the original page is reflected.

<Stapling Control>

Now, a stapling control performed by the bookbinding application 104 of the digital computer 100, which is connected to a printer having a stapling function, is described.

Figure 13:
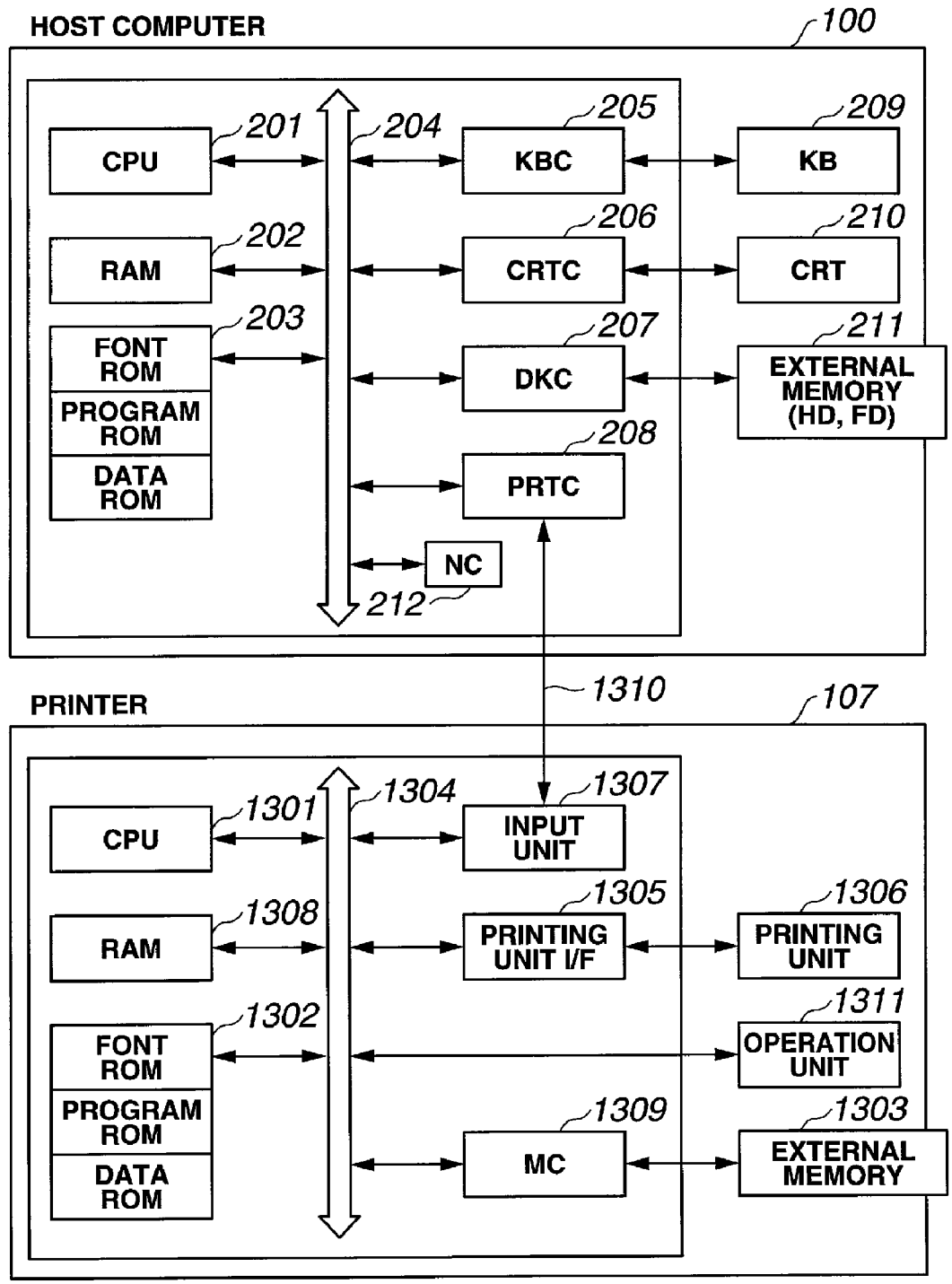
FIG. 13 schematically illustrates an exemplary configuration of a stapling control system according to the first exemplary embodiment of the present invention.

FIG. 13 illustrates an exemplary configuration of a stapling control system. As illustrated in FIG. 13, the stapling control system includes the digital computer 100 and the printer 107 having a stapling function, which are illustrated in FIG. 2.

The configuration of the printer 107 is as described below. Note that features of the present invention can be applied to a system constituted by a single apparatus, a system constituted by a plurality of apparatuses, or to a system in which apparatuses are connected via a network such as a local area network (LAN) and a wide area network (WAN) to perform processing, as long as the functions of the present invention can be implemented.

As illustrated in FIG. 13, the printer 107 includes a printer central processing unit (CPU) 1301. The CPU 1301 sends an image signal to a printing unit (printer engine) 1306 as output information, via a printing unit interface (I/F) 1305 connected to a system bus 1304, based on a control program stored in a ROM 1302 or an external memory 1303. In a program ROM in the ROM 1302, a control program of the CPU 1301 is stored.

In addition, in a font ROM in the ROM 1302, font data used in generating output information is stored. In a data ROM in the ROM 1302, in the case where the printer 107 does not include an external memory 1303 such as a hard disk, information utilized on the digital computer 100 is stored.

In addition, the CPU 1301 is capable of performing processing for communicating with the digital computer 100 via an input unit 1307. Thus, the CPU 1301 can notify information stored in the printer 107 to the digital computer 100. A RAM 1308 functions as a main memory and a work area of the CPU 1301. The RAM 1308 is configured so that a memory capacity thereof can be expanded with an optional RAM connected to an expansion port (not shown).

Note that the RAM 1308 is used as an output information development area, an environmental data storage area, and a non-volatile random access memory (NVRAM). The external memory 1303, such as a hard disk (HD) or an integrated circuit (IC) card, is controlled by a memory controller (MC) 1309 for its access.

The external memory 1303 is connected as an optional memory and stores font data, an emulation program, and form data. In addition, an operation unit 1311 includes a switch used for operation by a user and a light emitting diode (LED) display device.

Furthermore, the number of the external memory 1303 described above is not limited to one. That is, the configuration of the present exemplary embodiment can be arranged such that a plurality of external memories 1303 are provided to store a program for interpreting printer control languages of different language systems in addition to built-in fonts. Moreover, the configuration can be arranged such that an NVRAM (not shown) is provided to store printer mode setting information sent from the operation unit 1311.

<Configuration of Case Book Binding>

Figure 14:
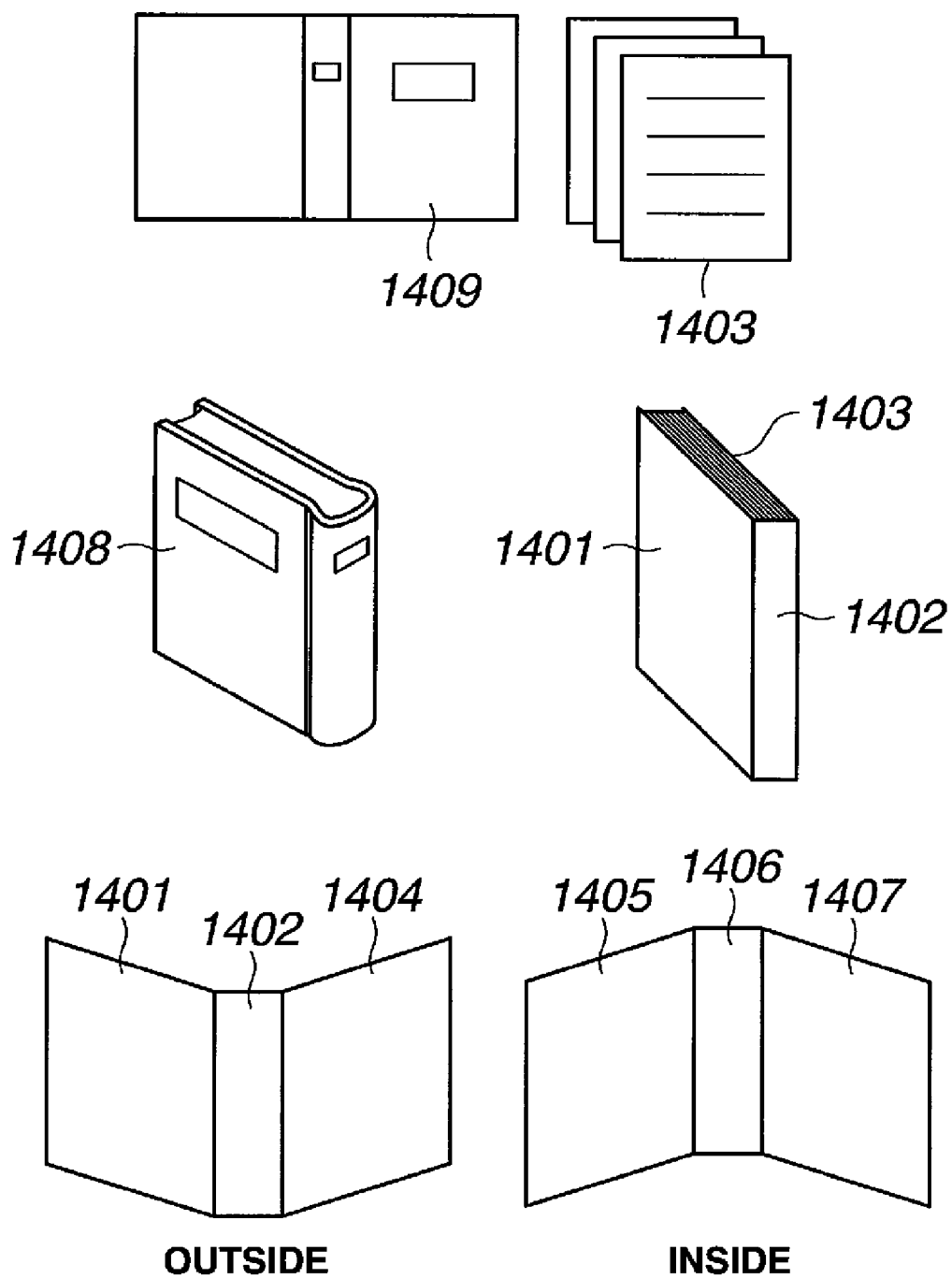
FIG. 14 schematically illustrates an example of case book binding according to the first exemplary embodiment of the present invention.

FIG. 14 schematically illustrates an exemplary configuration of case book binding.

Generally, a book 1409 having a case book binding includes a cover 1409 and inside pages (textblock) 1403. Case book binding is a bookbinding method in which paper sheets are glued at a spine portion 1402 and are wrapped with the cover 1409 to be bound.

In the case of an open-to-left bound print product, the first cover (outside front cover) 1404 is called a "cover 1", the back side (inside front cover) 1504 of the cover 1404 is called a "cover 2", the back side (inside back cover) 1407 of a back cover is called a "cover 3", and the front side (outside back cover) 1401 of the back cover is called a "cover 4". In the case of an open-to-right bound print product, the cover order is symmetrical to that in the case of the open-to-left bound print product. That is, the cover 1401 is called a "cover 1", the cover 1407 is called a "cover 2", the cover 1405 is called a "cover 3", and the cover 1404 is called a "cover 4".

After an original is placed onto a cover, in order to align the position of inside pages with the position of the cover, it is necessary to produce covers 1 through 4 in the same original size as the original size of the inside pages.

Figure 15:
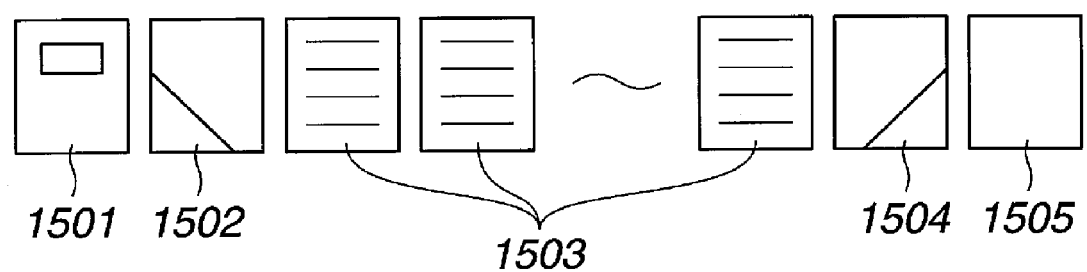
FIG. 15 schematically illustrates an example of an original document in which covers 1 through 4 and inside pages are produced in the same original size, according to the first exemplary embodiment of the present invention.
Figure 16:
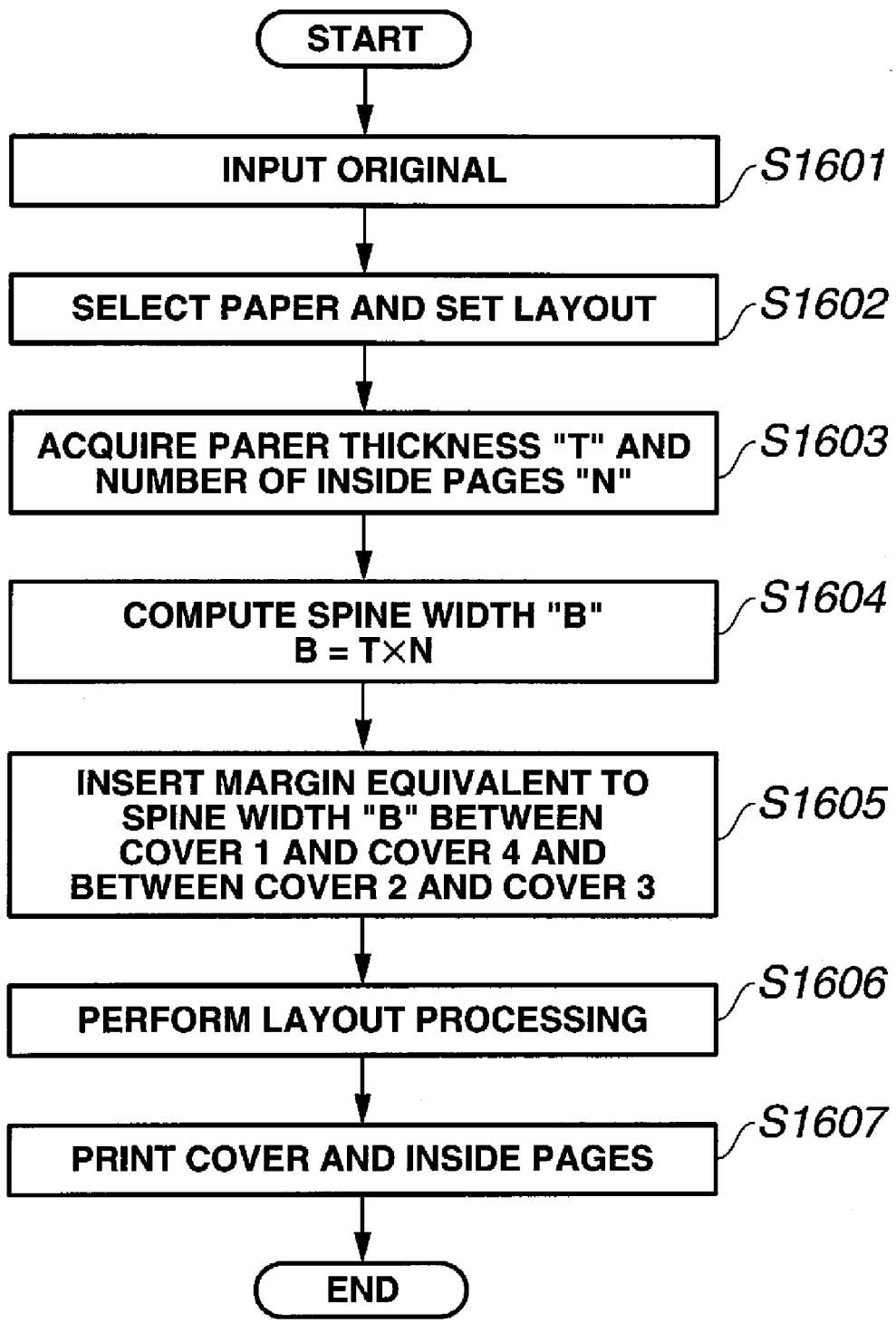
FIG. 16 is a flow chart illustrating an exemplary flow of processing for performing case book binding when an original document is input in which covers 1 through 4 and inside pages are produced in the same original size, according to the first exemplary embodiment of the present invention.

FIG. 15 illustrates an example in which covers 1 through 4 and inside pages are produced in the same original size. The example illustrates a cover 1 1501, a cover 2 1502, inside pages 1503, a cover 3 1504, and a cover 4 1505. FIG. 16 illustrates an exemplary flow of processing for laying out each of the covers 1 through 4 and the inside papers onto an output paper.

FIG. 16 is a flow chart illustrating an exemplary flow of processing for producing a layout for performing case book binding when an original document is input in which covers 1 through 4 and inside pages are produced in the same original size. Referring to FIG. 16, first, in step S1601, the bookbinding application 104 inputs data as an original.

In step S1602, the bookbinding application 104 selects a paper selected by a user via an operation screen as a paper onto which the input original data is printed and sets a layout.

In step S1603, the bookbinding application 104 calculates the thickness of the paper and the number of output sheets necessary for the inside pages based on the set paper and layout. The paper thickness can be acquired based on a thickness allocated for the paper, or alternatively, can be a value calculated based on a basis weight of the paper. Here, note that the basis weight refers to a mass per unit area.

In step S1604, the bookbinding application 104 calculated a spine width by multiplying the thickness per sheet by the number of sheets. Although not described here, in the case where the paper thickness varies at the time of compress-bonding performed during gluing in case book binding, the spine width can be calculated by multiplying the result obtained in the calculation in step S1604 by an arbitrary coefficient.

In step S1605, the bookbinding application 104 inserts a margin equivalent to the spine width calculated in step S1604 between the cover 1 and the cover 4 and between the cover 2 and the cover 3. In step S1606, the bookbinding application 104 performs layout processing. Arbitrary text or images can be inserted to the margin portion between the cover 1 and the cover 4.

In step S1607, the bookbinding application 104 outputs data for printing the laid-out covers and inside pages.

Now, paper layout processing performed in step S1606 is described with reference to FIG. 17.

Figure 17:
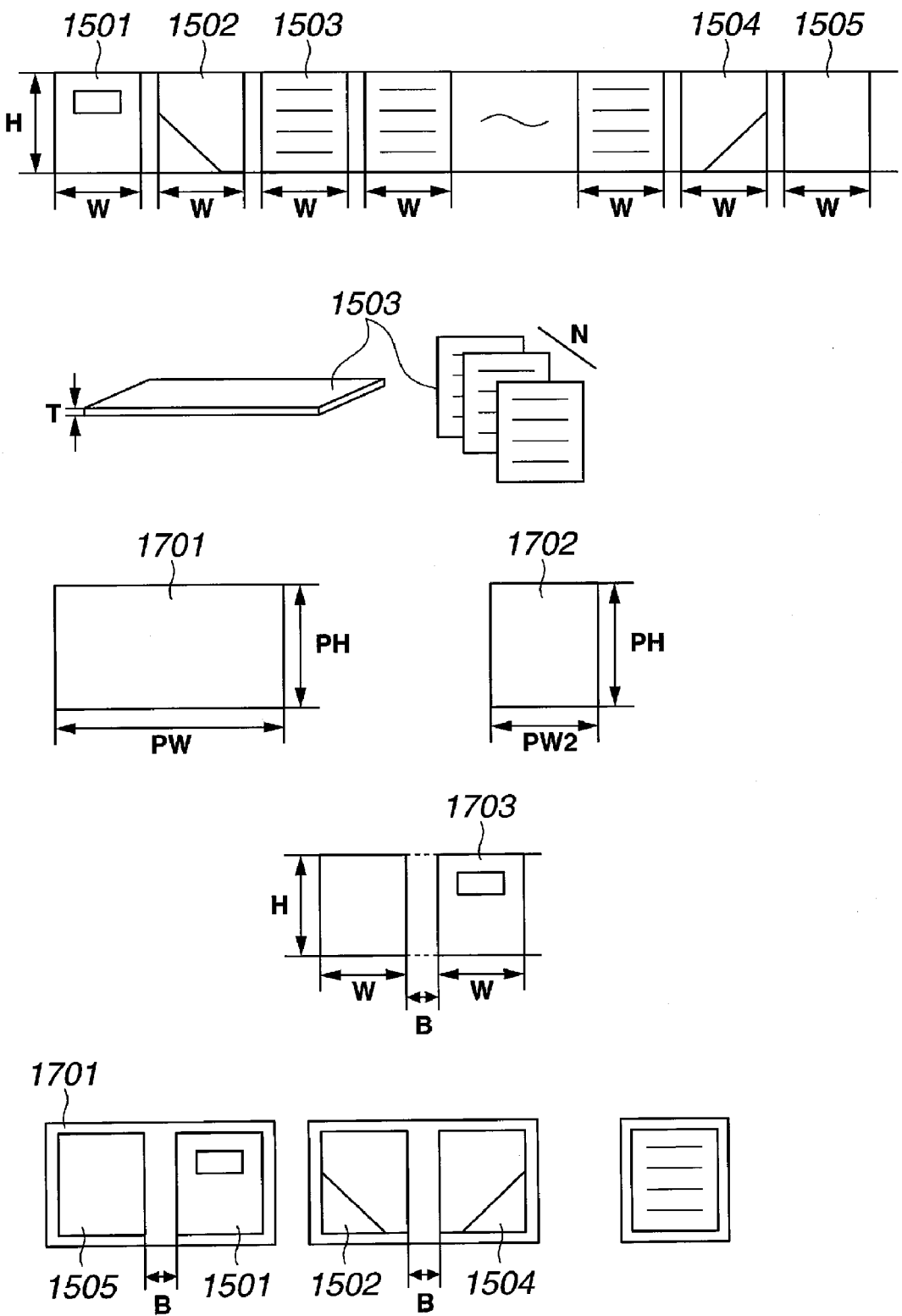
FIG. 17 schematically illustrates a size of a sheet used in a method for laying out a cover according to the first exemplary embodiment of the present invention.

Referring to FIG. 17, "B" indicates a spine width that is calculated in step S1604 in FIG. 16. "T" indicates a thickness per sheet, and "N" indicates the number of sheets. The example shown in FIG. 17 illustrates an output sheet 1701, which is used for a cover, and an output sheet 1702, which is used for an inside page.

With respect to cover data to be laid out onto the cover 1701, the bookbinding application 104 leaves an area for the margin "B" calculated in step S1604 between the cover 1 and the cover 4 to provide a finished page area 1703. Accordingly, the width of the finished page area 1703 can be expressed by "2×W+B", and the height of the finished page area 1703 is "H".

That is, the bookbinding application 104 generates output data by laying out page data to be used as a cover, of the page data included in the received original data, while leaving a margin equivalent to the spine width calculated in step S1604 between the outside front and back covers.

Similar processing is performed for the inside front and back covers. The book binding application 104 leaves an area for the margin "B" between the cover 2 and the cover 3 to produce a finished page area and generates data to be disposed onto the back side of the output sheet 1701.

On the inside sheet 1702, the inside page 1503 is disposed to be printed.

Figure 18:
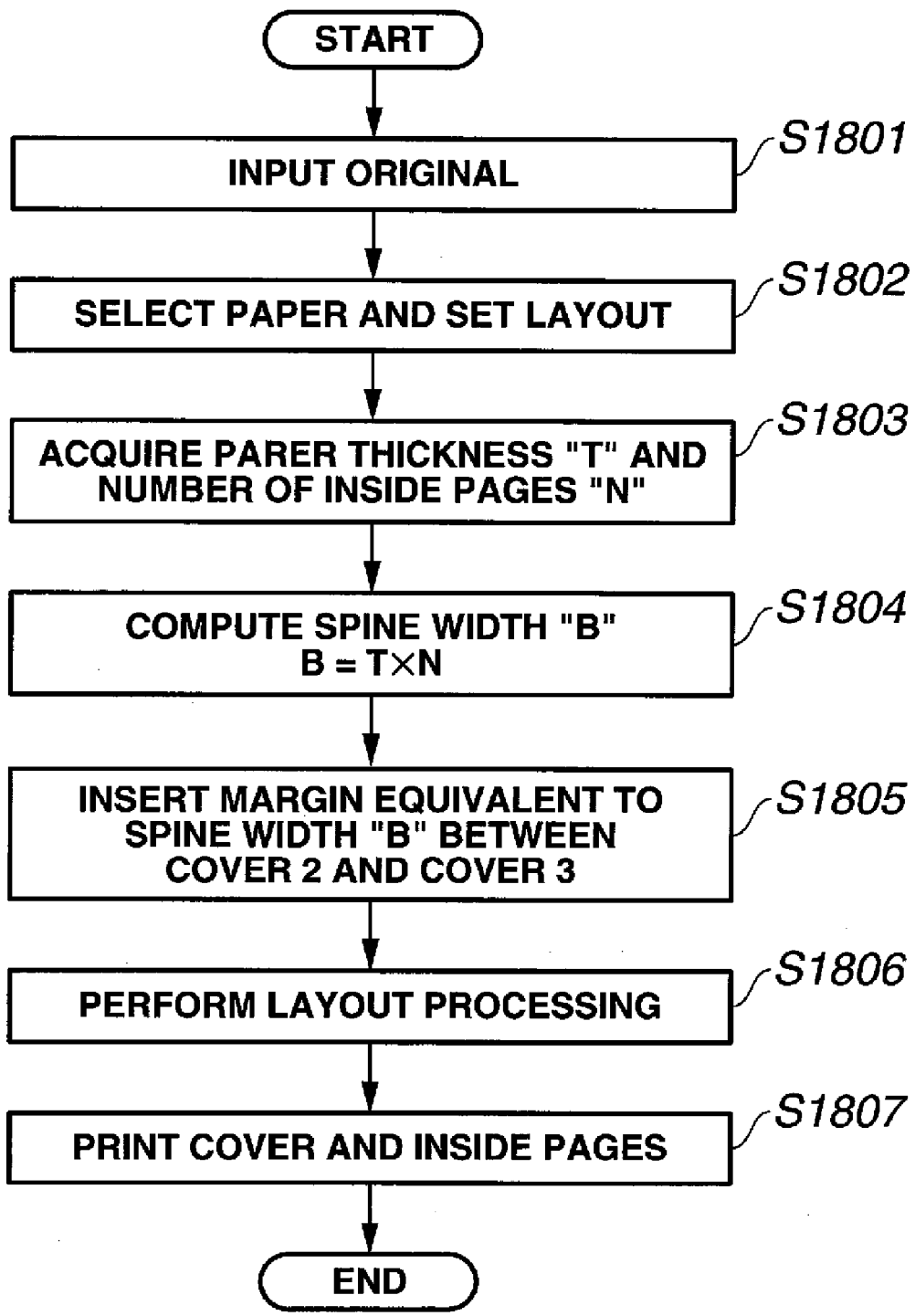
FIG. 18 is a flow chart illustrating an exemplary flow of processing for performing case book binding when an original document is input in which outside front and back covers are produced in one full page area and inside front and back covers and inside pages are produced in a size for bookbinding, which size is different from the size of the outside front and back covers, according to the first exemplary embodiment of the present invention.

There can be a case where an original document is input in which outside front and back covers are produced in one full page area and inside front and back covers and inside pages are produced in a finishing size for bookbinding. FIG. 18 is a flow chart illustrating an exemplary flow of processing for generating a layout performed in case book binding in the case where an original document is input in which outside front and back covers are produced in one full page area and inside front and back covers and inside pages are produced in a size for bookbinding, which size is different from the size of the outside front and back covers.

Referring to FIG. 18, first, in step S1801, the bookbinding application 104 inputs original data for a cover and original data for inside pages.

In step S1802, the bookbinding application 104 selects a paper onto which the input original data is printed and sets a layout.

In step S1803, the bookbinding application 104 calculates the paper thickness per sheet and the number of output sheets necessary for the inside pages based on the set paper and layout.

In step S1804, the bookbinding application 104 calculates a spine width by multiplying the paper thickness by the number of sheets.

In step S1805, the bookbinding application 104 insets a margin equivalent to the spine width calculated in step S1804 between the cover 2 and the cover 3. In step S1806, the bookbinding application 104 performs layout processing.

In step S1807, the bookbinding application 104 generates data for the laid-out cover and inside pages.

Figure 19:
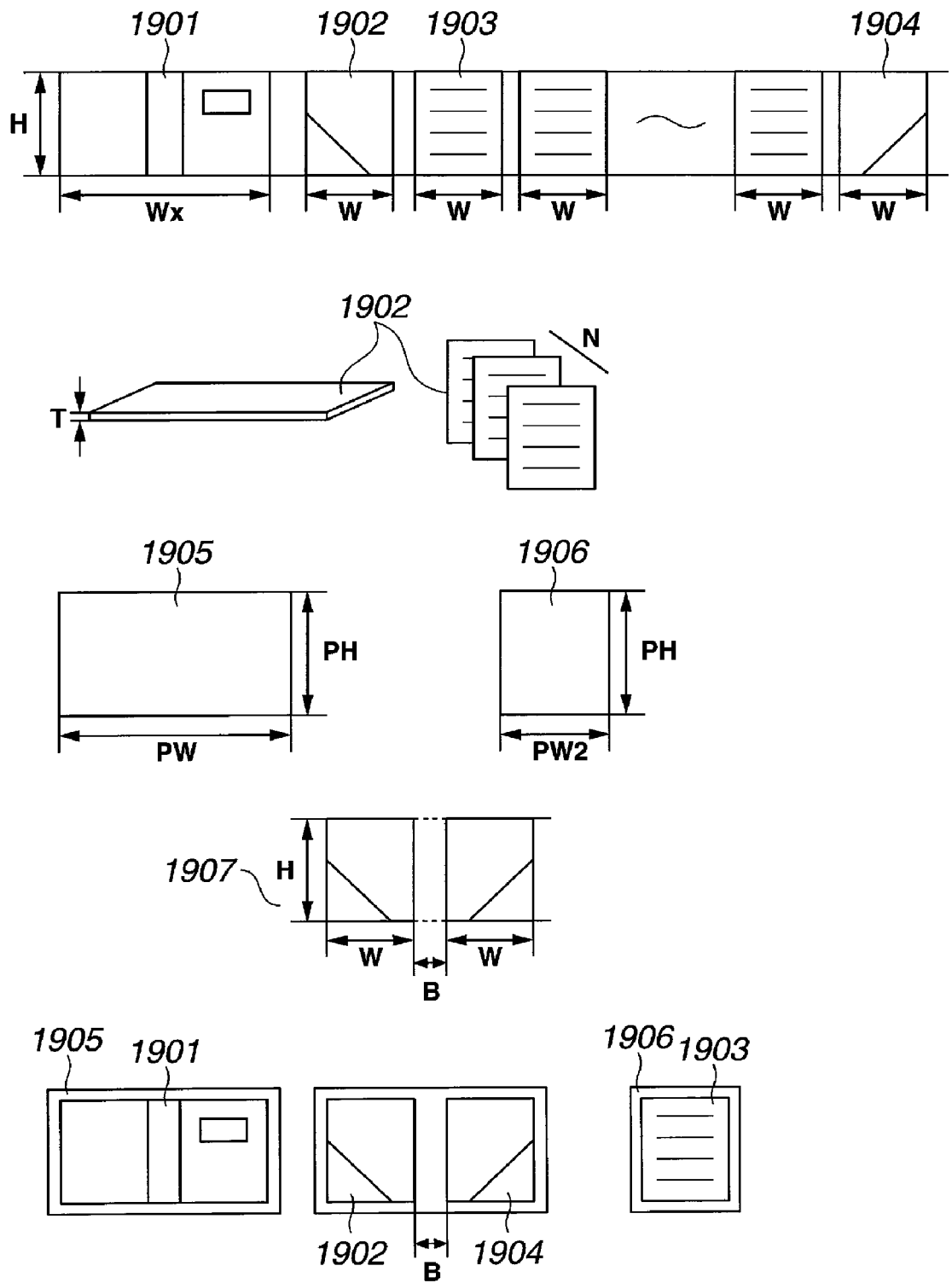
FIG. 19 schematically illustrates an example of a size of a sheet used in a method for laying out a cover according to the first exemplary embodiment of the present invention.

FIG. 19 illustrates a method of laying out a cover. In FIG. 19, "B" indicates a spine width that is calculated in step S1804 in FIG. 18. "T" indicates a thickness per sheet, and "N" indicates the number of sheets. The example shown in FIG. 19 illustrates an output sheet 1905, which is used for a cover, and an output sheet 1906, which is used for an inside page 1903.

With respect to cover data to be laid out inside the cover, the bookbinding application 104 leaves a margin "B" calculated in step S1804 between the cover 2 1902 and the cover 3 1904 to provide a finished page area 1907. Accordingly, the width of the finished page area can be expressed by "2×W+B", and the height of the finished page area is "H". The finished page area 1907 is laid out onto the back side of the output sheet 1905 to be printed. The outside cover data 1901 is disposed onto the front side of the output sheet 1905, while being center-aligned, to be printed.

With the above-described configuration, even when variation occurs between the front cover and the back cover due to variation in the paper thickness for the inside pages and the number of sheets for the inside pages, no deviation in the printing position between the front and the back covers occurs. Accordingly, a well-balanced bound print product can be produced.

Second Exemplary Embodiment

In a second exemplary embodiment of the present invention, processing for determining a layout for a cover based on input original data and print format information that is set is described.

Figure 20:
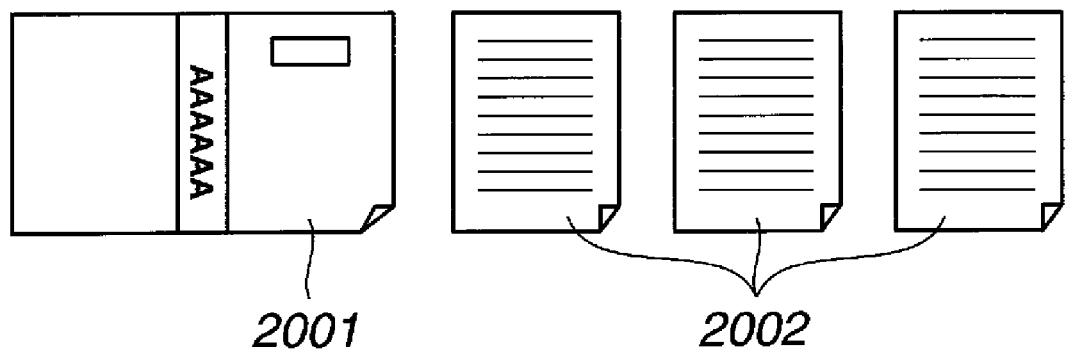
FIG. 20 schematically illustrates an example of case book binding according to a second exemplary embodiment of the present invention.

FIG. 20 illustrates an output result obtained by performing printing processing for case book binding. In case book binding, a cover 2001 for wrapping a textblock and inside pages 2002 for the textblock are required.

Figure 21:
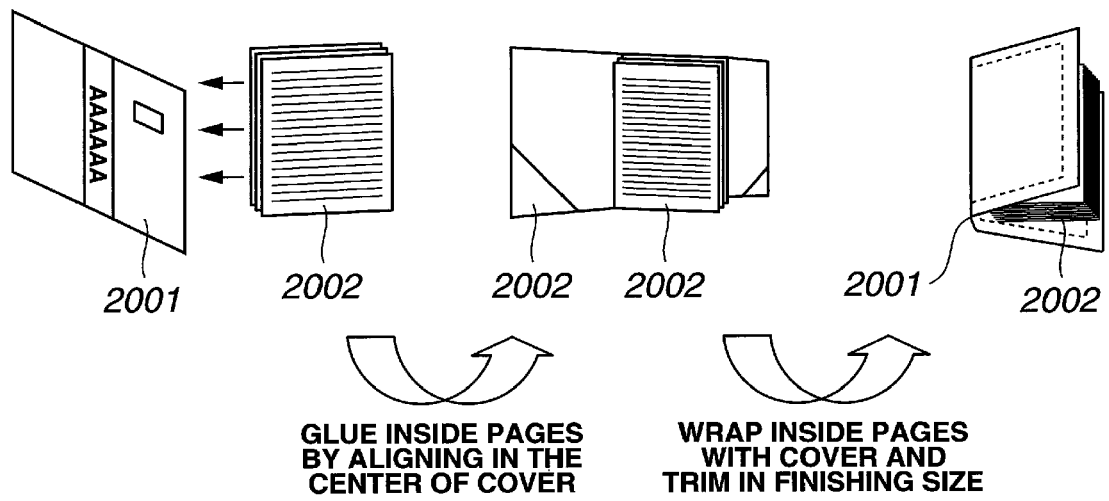
FIG. 21 schematically illustrates an example of a method for case book binding according to the second exemplary embodiment of the present invention.

FIG. 21 illustrates a process for case book binding.

The case book binding is performed as described in the following. First, gluing is performed at a binding side of inside pages 2002, which are a textblock. Then, the glued inside pages 2002 are attached to the cover 2001 while being center-aligned. Then, the inside pages 2002 are wrapped with the cover 2001. Generally, the bound book is trimmed in three sides to be finished.

<Method of Producing a Book by Case Book Binding>

Figure 22:
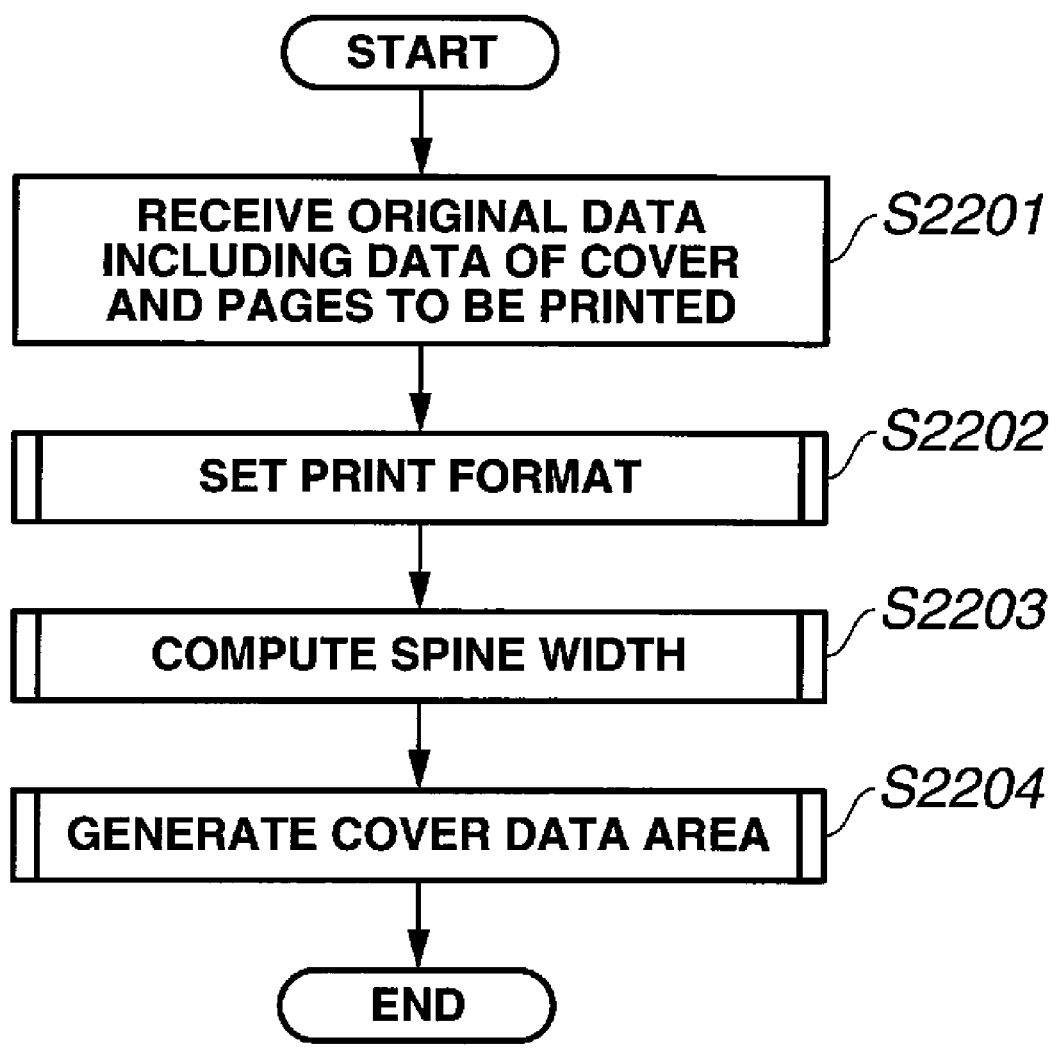
FIG. 22 is a flow chart illustrating an exemplary flow of entire processing according to the second exemplary embodiment of the present invention.

FIG. 22 is a flow chart illustrating an exemplary flow of processing performed for producing a book by the bookbinding application 104 according to the second exemplary embodiment of the present invention.

Referring to FIG. 22, first, in step S2201, the bookbinding application 104 receives original data including data for a cover and pages to be printed from the general application 101 illustrated in FIG. 1.

In step S2202, the bookbinding application 104 recognizes the setting set by a user and sets a print format to the original data.

In step S2203, the bookbinding application 104 calculates a spine width based on the input original data and the set print format. In step S2204, the bookbinding application 104 generates a cover data area.

<Setting of Print Format>

The processing for setting a print format performed in step S2202 in FIG. 22 is described in detail with reference to FIG. 23, FIG. 32, and FIG. 33.

Figure 23:
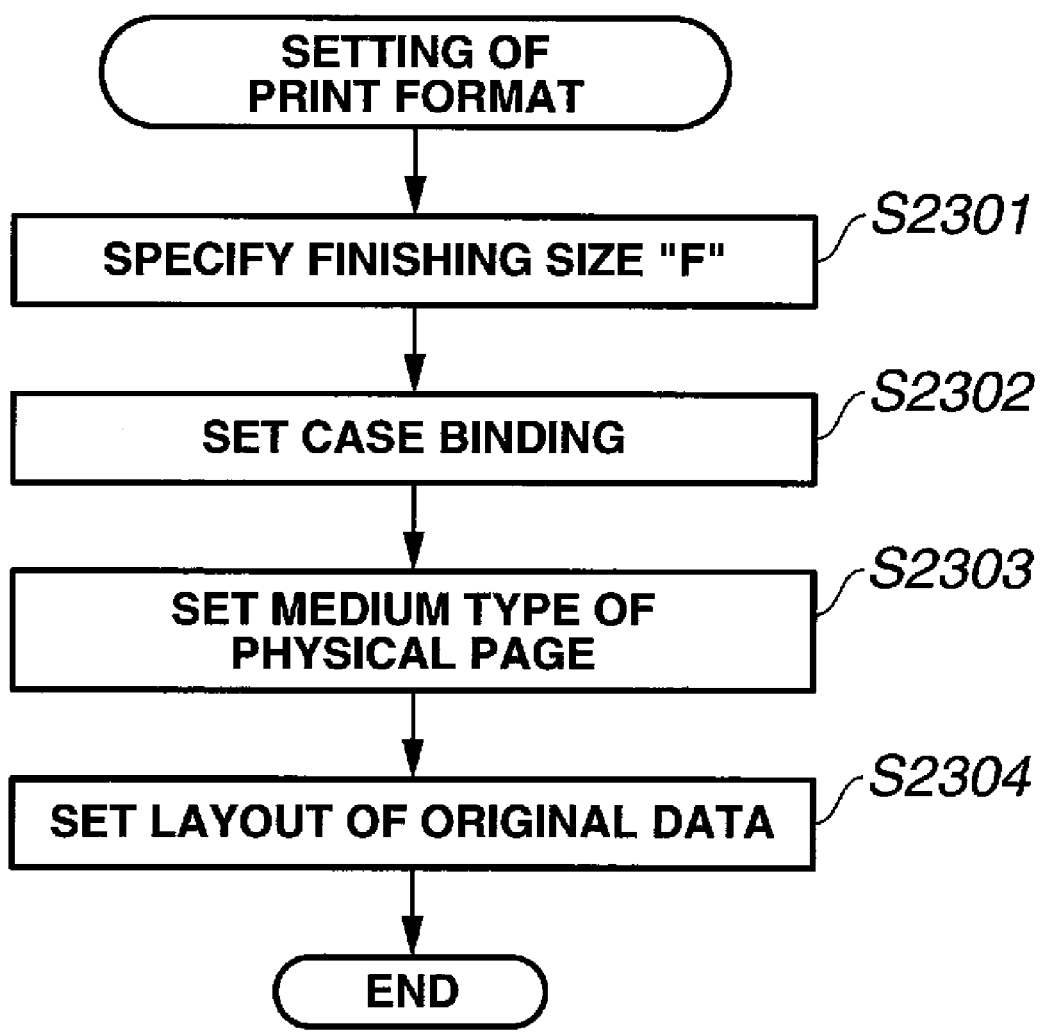
FIG. 23 is a flow chart illustrating a flow of processing for performing a setting as to an format according to the second exemplary embodiment of the present invention.
Figure 32:
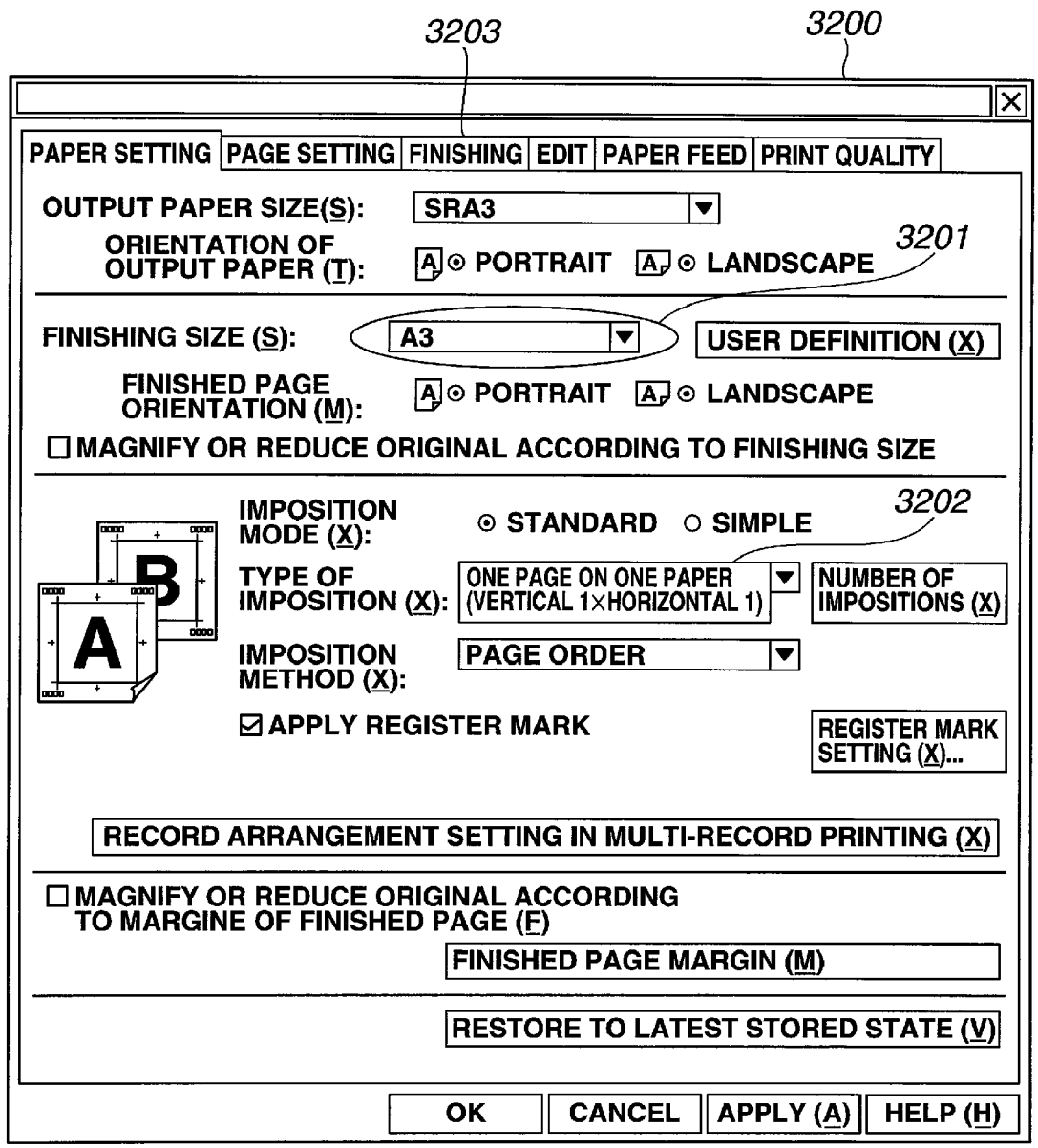
FIG. 32 illustrates an example of a setting screen displayed during paper setting processing according to the second exemplary embodiment of the present invention.

Referring to FIG. 23, first, in step S2301, the bookbinding application 104 recognizes a finishing size F set by an operator using a setting screen 3200 illustrated in FIG. 32.

Figure 24:
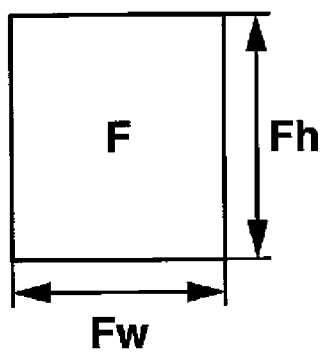
FIG. 24 schematically illustrates an example of a finishing size according to the second exemplary embodiment of the present invention.

Note that as illustrated in FIG. 24, the finishing size F includes information about a "finishing size width" Fw and a "finishing size height" Fh. In addition, the finishing size F is a size specified at the time of order from a customer.

FIG. 32 illustrates an example of a setting screen displayed during processing for paper setting. The bookbinding application 104 displays a setting screen 3200 illustrated in FIG. 32 upon receiving of a given operation.

The operator selects a finishing size via the setting screen 3200 illustrated in FIG. 32. Note that the finishing size is selected by using finishing size setting items 3201. In the illustration in FIG. 32, size A3 is selected at the finishing size field 3201.

Furthermore, the operator can set text output format information via the setting screen 3200 illustrated in FIG. 32. Note that in the setting screen 3200, an item 3202 for setting a type of imposition is displayed as an example of the output format information.

In step S2302, the bookbinding application 104 determines whether a user sets case book binding. When a "finishing" tab 3203 is selected via the setting screen 3200 illustrated in FIG. 32, a setting screen 3300 illustrated in FIG. 33 is displayed.

Figure 33:
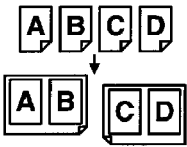
FIG. 33 illustrates an example of a setting screen displayed during finishing processing according to the second exemplary embodiment of the present invention.

When the operator selects "case book binding" via a binding and stitching setting item 3301 in the setting screen 3300 illustrated in FIG. 33, case book binding is set.

Furthermore, the operator sets cover print format information based on the input original data. Note that the cover print format information is set via an item 3302.

As shown in the setting screen 3300 in FIG. 33, the print format is set to "outside×inside: 2×2". Note that the processing for setting cover print format information performed via the setting screen 3300 illustrated in FIG. 33 is to be described later below with reference to FIGS. 29A through 29C.

In addition, while, in the setting screen 3300 illustrated in FIG. 33, the print format is set to "outside×inside: 2×2", print formats "outside×inside: 1×2" and "outside×inside: 2×1" can be selected, which are to be described later below with reference to FIGS. 29A through 29C.

In addition, the setting screen 3300 illustrated in FIG. 33 includes a finishing setting item 3303, which is to be described later below with reference to FIG. 34.

As described above, the bookbinding application 104, in order to perform processing for laying out the cover including a back cover, sets a type of a layout that is input as a cover layout type to be used at the time of outputting, from among a plurality of cover layout types, via the setting screen 3300 illustrated in FIG. 33.

When the case book binding is set in step S2302, the setting for a book is set to case book binding. In step S2303, the bookbinding application 104 sets a medium type of a physical page, and acquires the thickness of a paper of the set media type.

In step S2304, the bookbinding application 104 sets the arrangement order of original data and a layout for inside pages in case book binding.

<Calculation of Spine Width>

Now, processing for calculating a spine width performed in step S2203 illustrated in FIG. 22 is described in detail with reference to FIG. 25.

Figure 25:
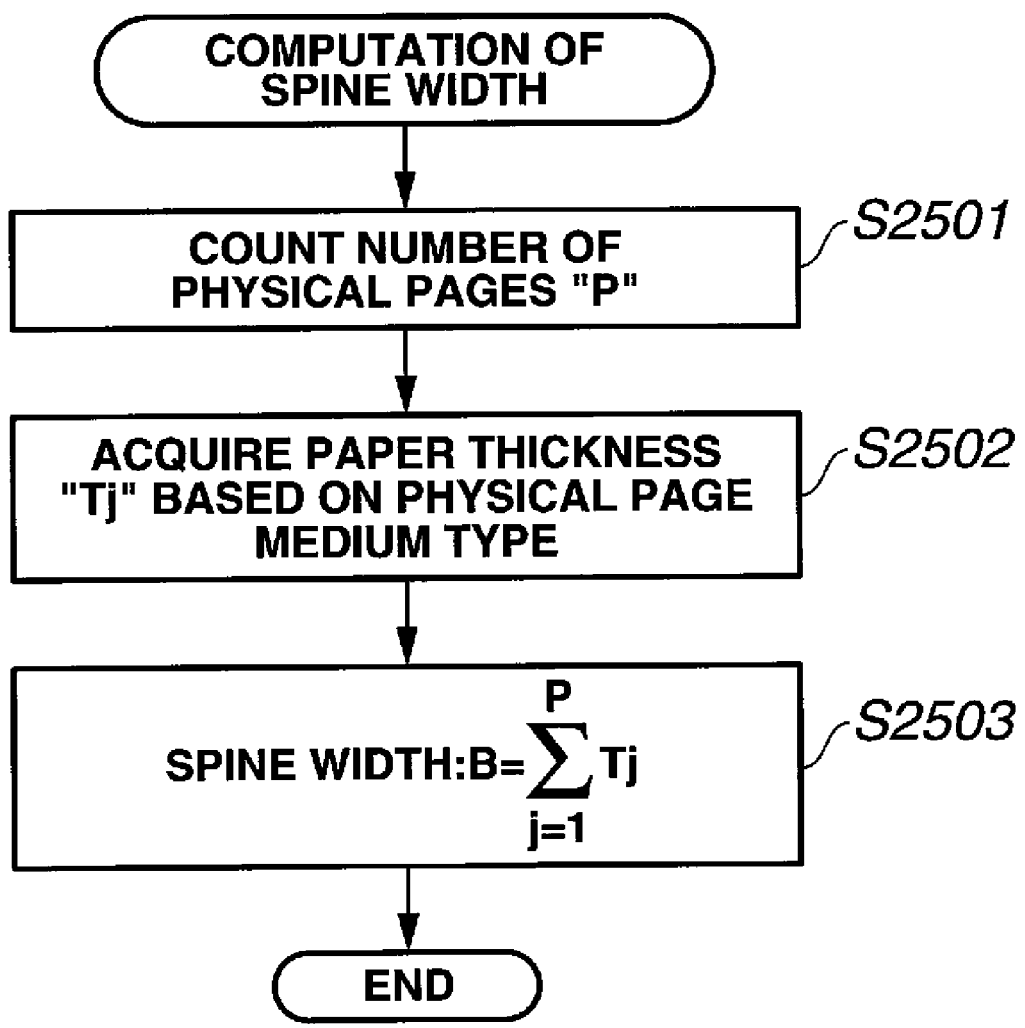
FIG. 25 is a flow chart illustrating an exemplary flow of processing for calculating a spine width according to the second exemplary embodiment of the present invention.

Referring to FIG. 25, in step S2501, based on the page data included in the original data and the output format information set in step S2202 in FIG. 22, the bookbinding application 104 calculates the number of physical pages to be output (P: output page number).

In step S2502, the bookbinding application 104 acquires a paper thickness Tj from the medium type that is set in step S2303 in FIG. 23. Note that information on the paper thickness per medium is previously stored in the RAM 202.

In step S2503, the bookbinding application 104 calculates a spine width B based on the number of output sheets calculated in step S2501 and the thickness Tj of the paper type for outputting included in the output format information. In the present embodiment, as a method of calculating a spine width, the bookbinding application 104 performs processing for multiplying the acquired paper thickness by the number of physical pages.

As described above, the size of the spine width is automatically calculated based on the number of output pages and the paper thickness according to the processing illustrated in FIG. 25.

<Generation of Cover Data Area>

Now, processing for generating a cover data area performed in step S2204 illustrated in FIG. 22 is described in detail with reference to FIG. 26.

Figure 26:
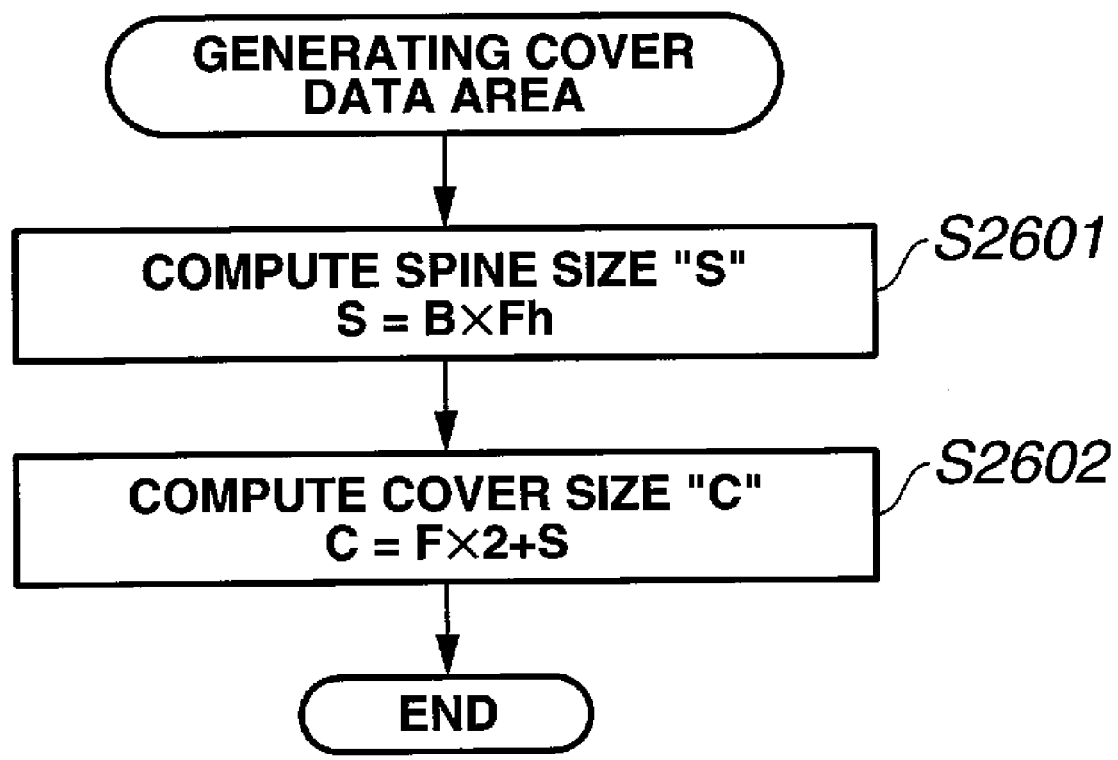
FIG. 26 is a flow chart illustrating an exemplary flow of processing for generating a cover data area according to the second exemplary embodiment of the present invention.

Referring to FIG. 26, first, in step S2601, the bookbinding application 104 calculates a spine size "S" by multiplying the spine width B, which is calculated in step S2503, by the "finishing size height" Fh, which is acquired in step S2301 illustrated in FIG. 23.

The processing in step S2601 is described in detail with reference to FIG. 27.

Figure 27:
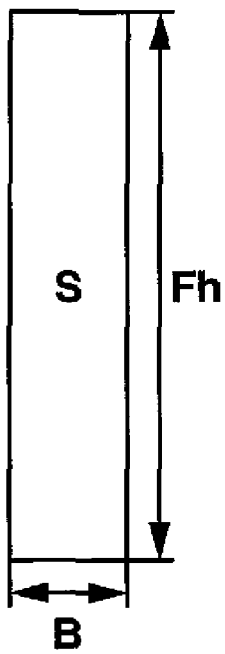
FIG. 27 schematically illustrates an example of a size of a spine according to the second exemplary embodiment of the present invention.

As illustrated in FIG. 27, the spine width B corresponds to a horizontal size of the spine and the "finishing size height" Fh acquired in step S2301 corresponds to a vertical size of the spine.

Accordingly, the spine size (area) can be calculated by an expression "B×Fh".

In step S2602, the bookbinding application 104 calculates a cover size "C", using the spine size S calculated in step S2601 and the finishing size F specified by the user.

Figure 28:
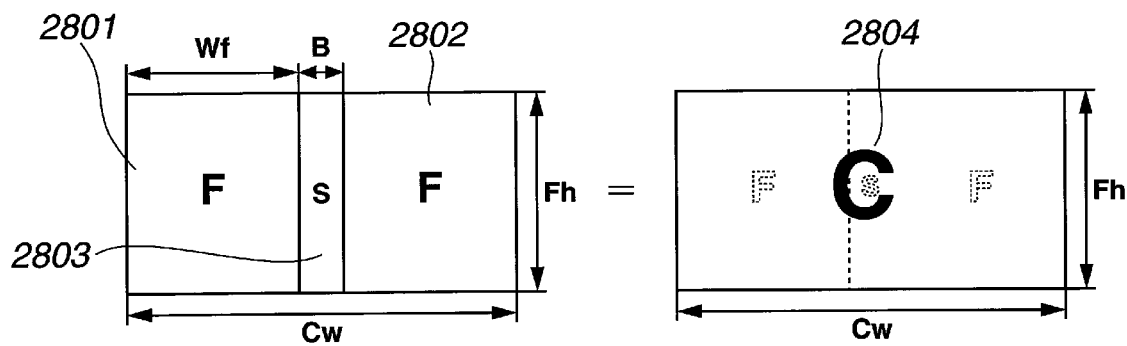
FIG. 28 schematically illustrates an example of a size of a cover according to the second exemplary embodiment of the present invention.

Now, the processing in step S2602 is described in detail with reference to FIG. 28.

For the cover size, a cover area 2801 and a cover area 2802 are considered, and a cover size S 2803 is also considered. That is, the sum of the cover area 2801, the cover area 2802, and the spine size S 2803 corresponds to a cover size "C" 2804.

As described above, a drawing area for the cover data in case book binding can be generated. In addition, in the case where the number of inside pages are increased or decreased during case book binding or where the paper thickness is changed due to a change in the medium type, the calculation processing in step S2503 can be performed again.

<Layout>

Now, a method of laying out a cover for the cover size C calculated in the processing illustrated in FIG. 26 is described with reference to FIGS. 29A through 29C.

First, a case 2900 illustrated in FIG. 29A is described.

A user (operator) operating the bookbinding application 104, when original data 2901 is input, can recognize that all the pages in the page data are in the same size.

Note that the input original data can be previewed as described above in FIG. 10, and accordingly, the user can readily confirm the page data included in the original data.

The user, in performing the processing for setting a print format, determines to dispose page data for two pages in the cover area for outside front and back covers (equivalent to the covers 1401 and 1404 in FIG. 14) and to dispose page data for two pages in the cover area for inside front and back covers (equivalent to the covers 1405 and 1407 in FIG. 14).

Thus, the user sets the print format of a cover to "outside× inside: 2×2" via the item 3302 in the setting screen 3300 illustrated in FIG. 33.

According to the setting performed by the user, the bookbinding application 104 lays out the first and last pages in the received original data 2901 onto an outside cover area 2902. In addition, the bookbinding application 104 lays out the second page and the last but one page in the original data 2901 onto an inside cover area 2903.

That is, the bookbinding application 104 lays out the page data determined according to the set cover layout type in a manner corresponding to the set cover layout type.

Now, a case 2904 is described.

The user operating the bookbinding application 104, when original data 2905 is input, can recognize that one page data (page data for the covers 2 and 3) is input in a size different from the size of other page data.

The user, based on the original data 2905, recognizes that the page data for the covers 2 and 3 is data for inside front and back covers, and accordingly, in the processing for setting a print format, determines to dispose page data for two pages in the cover area for outside front and back covers and to dispose page data for one page in the cover area for inside front and back covers. Thus, the user sets the print format of a cover to "outside×inside: 2×1".

According to this setting, the bookbinding application 104 lays out the first and last pages in the received original data 2905 onto an outside cover area 2906. In addition, the bookbinding application 104 lays out page data of the covers 2 and 3, which is data of the second page in the original data 2905, onto an inside cover area 2907.

Now, a case 2908 is described.

The user operating the bookbinding application 104, when original data 2909 is input, can recognize that one page data (page data for the covers 4 and 1) is input in a size different from the size of other page data.

The user, based on the original data 2909, recognizes that the page data for the covers 4 and 1 is data for outside front and back covers, and accordingly, in the processing for setting a print format, determines to dispose page data for one page in the cover area for outside front and back covers and to dispose page data for two pages in the cover area for inside front and back covers. Thus, the user sets the print format of a cover to "outside×inside: 1×2".

According to this setting, the bookbinding application 104 lays out page data for the covers 4 and 1, which correspond to the first page in the received original data 2909, onto an outside cover area 2910. In addition, the bookbinding application 104 lays out page data for the second and the last pages in the original data 2909 onto an inside cover area 2911.

Now, a case 2912 is described.

The user operating the bookbinding application 104, when original data 2913 is input, can recognize that two page data (page data for the covers 4 and 1 and covers 2 and 3) is input in a size different from the size of other page data.

The user, based on the original data 2913, recognizes that the page data for the covers 4 and 1 is data for outside front and back covers and that the page data for the covers 2 and 3 is data for inside front and back covers, and accordingly, in the processing for setting a print format, determines to dispose page data for one page in each of the cover areas for outside front and back covers and inside front and back covers. Thus, the user sets the print format of a cover to "outside×inside: 1×1".

According to this setting, the bookbinding application 104 lays out page data for the first page in the received original data 2913 onto an outside cover area 2914. In addition, the bookbinding application 104 lays out page data for the second page in the original data 2913 onto an inside cover area 2915.

Now, a case 2916 is described.

The user operating the bookbinding application 104, when original data 2917 is input, can recognize that one page data (page data for the covers 4 and 1) is input in a size different from the size of other page data.

When the user recognizes, based on the original data 2917, that the page data for the covers 4 and 1 is data for outside front and back covers and determines that no page data to be disposed in the inside cover area is included in the original data 2917, the user determines, in the processing for setting a print format, to dispose page data for one page onto the outside cover area. In addition, the user determines to dispose no page data in the inside cover area. Thus, the user sets the print format of a cover to "outside×inside: 1×0".

According to this setting, the bookbinding application 104 lays out page data for the first page in the received original data 2917 onto an outside cover area 2918. In addition, the bookbinding application 104 lays out no page data onto an inside cover area 2919.

Now, a case 2920 is described.

The user operating the bookbinding application 104, when original data 2921 is input, can recognize that one page data (page data for the covers 2 and 3) is input in a size different from the size of other page data.

When the user recognizes, based on the original data 2921, that the page data for the covers 2 and 3 is data for inside front and back covers and determines that no page data to be disposed in the outside cover area is included in the original data 2921, the user determines, in the processing for setting a print format, to dispose no page data in the outside cover area and to dispose page data for one page in the inside cover area. Thus, the user sets the print format of a cover to "outside×inside: 0×1".

According to this setting, the bookbinding application 104 lays out page data for the first page in the received original data 2921 onto an inside cover area 2923. In addition, the bookbinding application 104 lays out no page data onto an outside cover area 2922.

Now, a case 2924 is described.

The user operating the bookbinding application 104, when original data 2925 is input, can recognized that all of the pages in the page data are in the same size.

When the user determines, based on the original data 2925, that page data to be disposed in the outside cover area is not included in the original data 2925, the user determines, in the processing for setting a print format, to dispose no page data in the outside cover area. In addition, the user determines to dispose page data for two pages in the inside cover area. Thus, the user sets the print format of a cover to "outside×inside: 0×2".

According to this setting, the bookbinding application 104 lays out no page data onto an outside cover area 2926. In addition, the bookbinding application 104 lays out page data for the first and last pages in the original data 2925 onto an inside cover area 2927.

Now, a case 2928 is described.

The user operating the bookbinding application 104, when original data 2929 is input, can recognized that all of the pages in the page data are in the same size.

When the user determines, based on the original data 2929, that page data to be disposed in the inside cover area is not included in the original data 2929, the user determines, in the processing for setting a print format, to dispose page data for two pages in the outside cover area. In addition, the user determines to dispose no page data in the inside cover area. Thus, the user sets the print format of a cover to "outside×inside: 2×0".

According to this setting, the bookbinding application 104 lays out page data for the first and last pages in the original data 2929 onto an outside cover area 2930. In addition, the bookbinding application 104 lays out no page data onto an inside cover area 2931.

Now, a case 2932 is described.

The user operating the bookbinding application 104, when original data 2933 is input, can recognized that all of the pages in the page data are in the same size.

When the user determines, based on the original data 2929, that page data to be disposed in the cover is not included in the original data 2933, the user determines, in the processing for setting a print format, to dispose no page data in the outside and inside cover areas. Thus, the user sets the print format of a cover to "outside×inside: 0×0".

According to this setting, the bookbinding application 104 lays out no page data onto an outside cover area 2934 and an inside cover area 2935.

As described above, the user sets cover format information via the setting screen 3300 illustrated in FIG. 33 after confirming the input page data. Furthermore, the bookbinding application 104, according to the set cover format information, performs the layout processing, including the cover area, based on the input original data.

Now, a method of disposing page data in a cover area is described.

In the case where page data for two pages is disposed in one print area, the bookbinding application 104, in the drawing area generated in step S2602, disposes each page data in the finishing area F excluding the spine area S. Spine data is drawn in the spine area S.

In the case where the cover is an open-to-left cover, the first data is disposed in a right side of the cover data area. In the case where the cover is an open-to-right cover, the first data is disposed in a left side of the cover data area.

In the case where page data for one page is disposed in one print area, the bookbinding application 104, in the drawing area generated in step S2602, disposes each page data in the center of the cover area C including the spine area S.

Moreover, in the case where there exists not page data to be disposed in one print area, the bookbinding application 104 disposes no page data in the drawing area generated in step S2602.

Note that the bookbinding application 104 can perform layout processing on a cover area based on the page data determined in the method described with reference to FIGS. 29A through 29C and the size of the spine area determined in the processing described with reference to FIG. 25.

Now, a method of layout processing on a cover area described in FIGS. 29A through 29C is further described with reference to FIG. 31.

Figure 31:
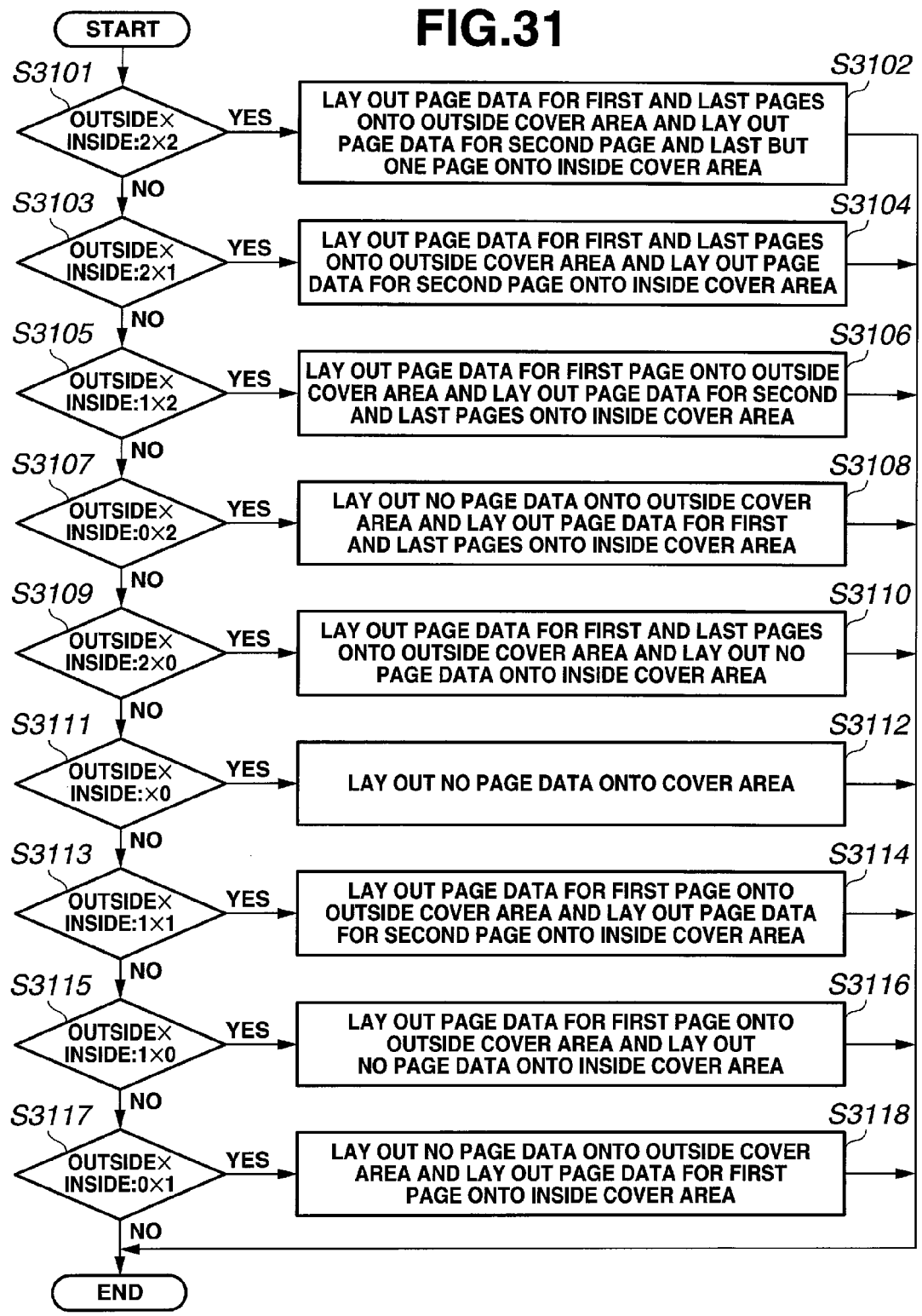
FIG. 31 is a flow chart illustrating an exemplary flow of processing for determining a cover layout according to the second exemplary embodiment of the present invention.

FIG. 31 is a flow chart illustrating an exemplary flow of processing for determining a cover layout according to the second exemplary embodiment. Referring to FIG. 31, first, in step S3101, the bookbinding application 104 determines whether the print format of a cover is set to "outside×inside: 2×2", in which page data for two pages is disposed in an outside cover area and page data for two pages is disposed in an inside cover area.

If it is determined in step S3101 that the print format of a cover is set to "outside×inside: 2×2", then in step S3102, the bookbinding application 104 lays out page data for the first and last pages included in the original data onto the outside cover area. Furthermore, in step S3102, the bookbinding application 104 lays out page data for the second page and the last but one page included in the original data onto the inside cover area.

In step S3103, the bookbinding application 104 determines whether the print format of a cover is set to "outside×inside: 2×1", in which page data for two pages is disposed in an outside cover area and page data for one page is disposed in an inside cover area.

If it is determined in step S3103 that the print format of a cover is set to "outside×inside: 2×1", then in step S3104, the bookbinding application 104 lays out page data for the first and last pages included in the original data onto the outside cover area. Furthermore, in step S3104, the bookbinding application 104 lays out page data for the second page included in the original data onto the inside cover area.

In step S3105, the bookbinding application 104 determines whether the print format of a cover is set to "outside×inside: 1×2", in which page data for one page is disposed in an outer cover area and page data for two pages is disposed in an inside cover area.

If it is determined in step S3105 that the print format of a cover is set to "outside×inside: 1×2", then in step S3106, the bookbinding application 104 lays out page data for the first page included in the original data onto the outside cover area. Furthermore, in step S3106, the bookbinding application 104 lays out page data for the second and the last pages included in the original data onto the inside cover area.

In step S3107, the bookbinding application 104 determines whether the print format of a cover is set to "outside×inside:

0×2", in which no page data is disposed in an outside cover area and page data for two pages is disposed in an inside cover area.

If it is determined in step S3107 that the print format of a cover is set to "outside×inside: 0×2", then in step S3108, the bookbinding application 104 lays out page data for the first and last pages included in the original data onto the inside cover area.

In step S3109, the bookbinding application 104 determines whether the print format of a cover is set to "outside×inside: 2×0", in which page data for two pages is disposed in an outside cover area and no page data is disposed in an inside cover area.

If it is determined in step S3109 that the print format of a cover is set to "outside×inside: 2×0", then in step S3110, the bookbinding application 104 lays out page data for the first and last pages included in the original data onto the outside cover area.

In step S3111, the bookbinding application 104 determines whether the print format of a cover is set to "outside×inside: 0×0", in which no page data is disposed in outside and inside cover areas.

If it is determined in step S3111 that the print format of a cover is set to "outside×inside: 0×0", then in step S3112, the bookbinding application 104 lays out no page data in the outside and inside cover areas.

In step S3113, the bookbinding application 104 determines whether the print format of a cover is set to "outside×inside: 1×1", in which page data for one page is disposed in an outside cover area and page data for one page is disposed in an inside cover area.

If it is determined in step S3113 that the print format of a cover is set to "outside×inside: 1×1", then in step S3114, the bookbinding application 104 lays out page data for the first page included in the original data onto the outside cover area. Furthermore, in step S3114, the bookbinding application 104 lays out page data for the second page included in the original data onto the inside cover area.

In step S3115, the bookbinding application 104 determines whether the print format of a cover is set to "outside×inside: 1×0", in which page data for one page is disposed in an outside cover area and no page data is disposed in an inside cover area.

If it is determined in step S3115 that the print format of a cover is set to "outside×inside: 1×0", then in step S3116, the bookbinding application 104 lays out page data for the first page included in the original data onto the outside cover area.

In step S3117, the bookbinding application 104 determines whether the print format of a cover is set to "outside×inside: 0×1", in which no page data is disposed in an outside cover area and page data for one page is disposed in an inside cover area.

If it is determined in step S3117 that the print format of a cover is set to "outside×inside: 0×1", then in step S3118, the bookbinding application 104 lays out page data for the first page included in the original data onto the inside cover area.

As described above, the bookbinding application 104 determines page data to be laid out onto a cover area, from among page data included in the received original data, based on the set cover layout type.

Accordingly, the operator does not need to perform an operation for allocating page data page by page, and thus an operation efficiency can be improved.

<Method of Drawing Data on Spine>

The bookbinding application 104 is capable of rendering text data or image data in a spine area.

In addition, the back cover area includes a plurality of areas in which text data or image data is to be drawn. The bookbinding application 104 draws text data or image data in the selected drawing area.

Figure 30:
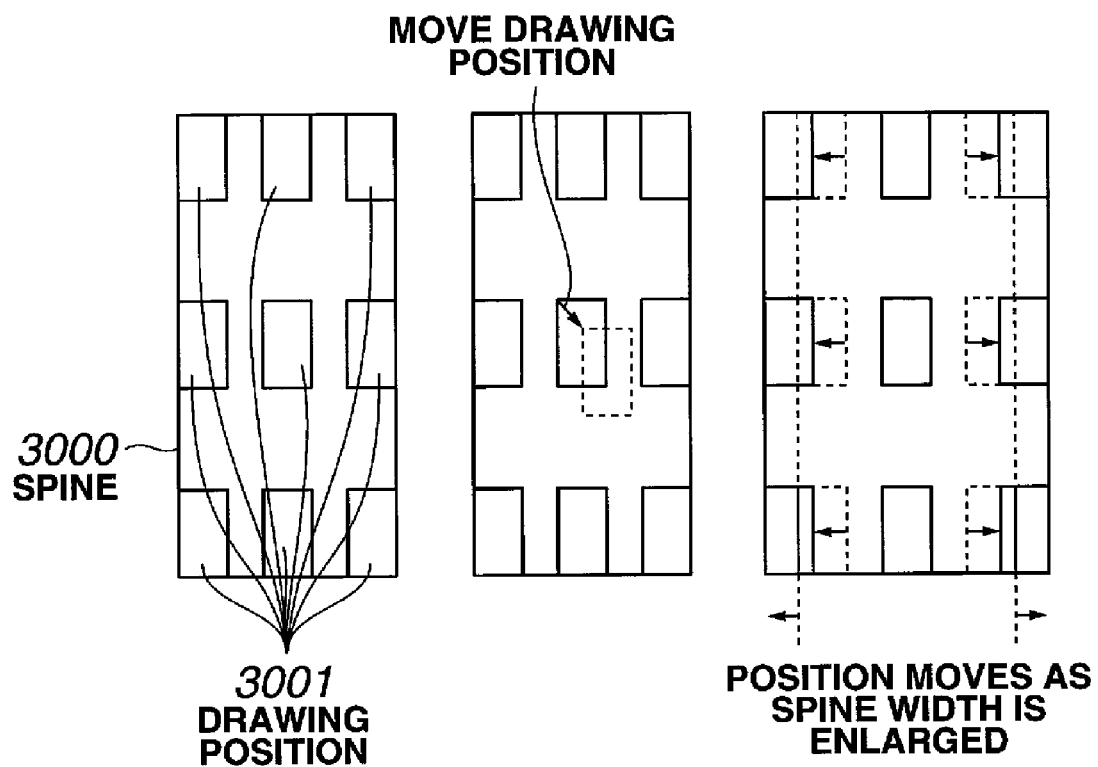
FIG. 30 schematically illustrates an example of processing for determining a drawing position in a spine according to the second exemplary embodiment of the present invention.

As illustrated in FIG. 30, a user can select a drawing area 3001 from among nine areas, namely, "top-left, top, top-right, left, center, right, bottom-left, bottom, and bottom-right" areas.

Now, a method of drawing data on a spine is described with reference to FIG. 30.

As is illustrated as a spine 3000 in FIG. 30, nine areas 3001 are set in the spine area.

The bookbinding application 104 draws text data or image data in the selected area. In addition, the bookbinding application 104 is also capable of changing the size of the drawing area according to an instruction generated by the user.

Furthermore, each drawing area retains positional information about the spine area. For example, the top-left drawing area is located at a position away from a top-left corner of the spine area by five millimeters in the vertical and horizontal directions.

Accordingly, the bookbinding application 104 can change the position of a drawing area according to a variation in the size of a specified spine area.

<Method for Generating Trimming Command>

As described above with reference to FIG. 21, the bookbinding application 104 determines that trimming processing is to be performed after case book binding is performed.

Now, a method for generating a command for performing trimming processing with the bookbinding application 104 is described with reference to FIG. 34.

Figure 34:
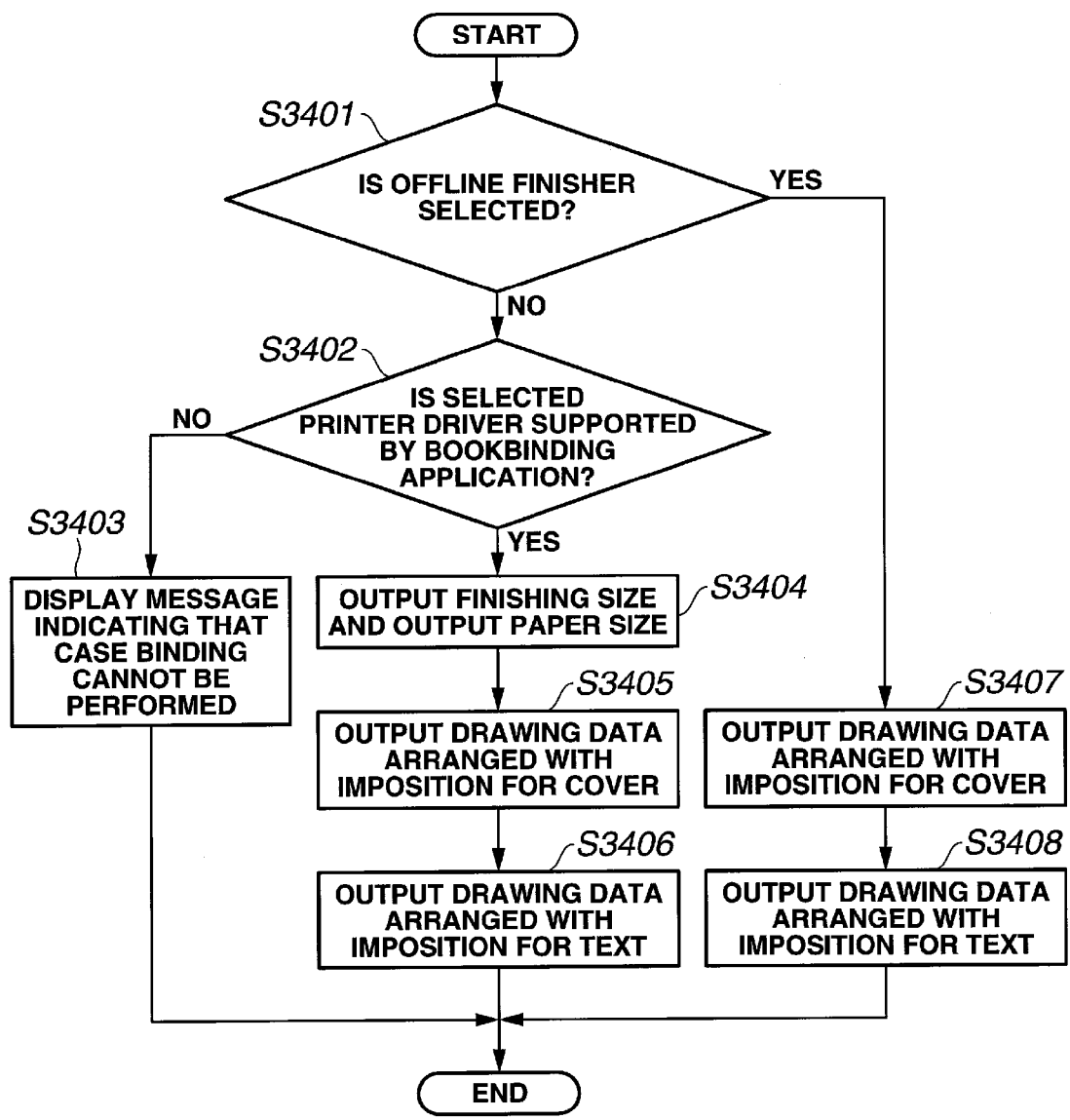
FIG. 34 is a flow chart illustrating an exemplary flow of processing related to trimming processing according to the second exemplary embodiment of the present invention.

FIG. 34 is a flow chart illustrating an exemplary flow of trimming processing. Referring to FIG. 34, first, in step S3401, the bookbinding application 104 determines whether a post-printing processing apparatus (hereinafter referred to as a "finisher") currently selected is an offline finisher.

Here, a user can select a type of finisher via the setting item 3303 in the setting UI illustrated in FIG. 33.

When the user operates a pull-down in the setting items 3303, alternatives such as "glue and wrap with cover (inline finisher)" and "glue and wrap with cover (offline finisher)" are displayed.

The content of the selection made via the setting screen 3300 illustrated in FIG. 33 is stored in the RAM 202. Accordingly, the bookbinding application 104 can perform the processing in step S3401 by referring to the RAM 202.

Now, various finisher types are described below.

(1) Inline finisher: The inline finisher is a post-processing apparatus in which a paper path is physically connected to a printer and units for operation instruction and status monitoring are electrically connected to the printer.

(2) Nearline finisher: The nearline finisher is a post-processing apparatus in which a paper path is not connected to a printer (that is, an operator needs to carry an output product) but units for operation instruction and status monitoring are capable of electrically sending and receiving information to or from the printer via a communication unit on a network.

(3) Offline finisher: The offline finisher is a post-processing apparatus in which neither a paper path nor a communication unit for operation instruction and status monitoring is connected to a printer at all. In the case of using the offline finisher, an operator needs to carry an output product, perform a setting as to an output product, perform an input operation by hand, and visually confirm a status report issued from the apparatus.

If it is determined in step S3401 that an offline finisher is selected (YES in step S3401), then in step S3407, the bookbinding application 104 outputs drawing data for a cover based on the cover layout determined in the processing illustrated in FIG. 31 to the printer driver 106 via the electronic original despooler 105. At this time, the bookbinding application 104 also outputs information on the size of the output paper for the cover.

In step S3408, the bookbinding application 104 outputs drawing data for the text based on the method of imposition set via the setting UI illustrated in FIG. 32 to the printer driver 106 via the electronic original despooler 105. At this time, the bookbinding application 104 also outputs information on the size of the output paper for the text.

Note that in the case where it is recognized that trimming processing is performed using an offline finisher, the bookbinding application 104 can generate drawing data in which the drawing data for the cover includes a mark indicating a position at which trimming is to be performed.

On the other hand, if it is determined in step S3401 that an offline finisher is not selected (NO in step S3401), then in step S3402, the bookbinding application 104 determines whether a selected printer driver is supported by the bookbinding application 104.

As one specific example of a method for this determination, the bookbinding application 104 can make a determination based on whether the bookbinding application 104 can recognize an expanded area of DEVMODE of the selected printer driver.

Note that "DEVMODE" refers to a file structure defined in Windows® OS. In DEVMODE, various print settings are stored. The settings are read by the printer driver at the time of print processing, and the read settings are used for generating print data. In an expanded area of DEVMODE, special processing information that Windows® OS does not support, such as "case book binding processing", is stored.

In step S3402, the determination processing is performed based on whether the bookbinding application 104 can recognize the processing information included in the expanded area of DEVMODE of the selected printer driver.

If it is determined in step S3402 that the selected printer driver is not supported by the bookbinding application 104 (NO in step S3402), then in step S3403, the bookbinding application 104 displays a message indicating that case book binding cannot be performed.

If it is determined in step S3402 that the selected printer driver is supported by the bookbinding application 104 (YES in step S3402), then in step S3404, the bookbinding application 104 outputs the size of the output paper for the cover specified via the setting screen 3300 illustrated in FIG. 33, the finishing size calculated in the processing illustrated in FIG. 23, and the trimming processing command to the printer driver 106 via the electronic original despooler 105.

Now, processing performed by the printer (inline finisher) that has received the print data generated by the printer driver based on the information received in the processing in step S3404 is described.

For example, the inline finisher determines a folding position at which folding processing is performed. Then, the inline finisher performs the trimming processing at the position of the finishing size with the determined folding position as a reference, and then an output result in the finishing size can be obtained.

In addition, with respect to a vertical direction of the printed result, an output result in the finishing size can be obtained by aligning a central point of the printed result with a central point of the finishing size and trimming a difference portion between them.

In step S3405, the bookbinding application 104 outputs the drawing data for the cover based on the cover layout determined in the processing in FIG. 31 to the printer driver 106 via the electronic original despooler 105.

That is, the bookbinding application 104 generates a book file including the drawing data for the cover whose layout in the cover area is determined (this book file is also called "print data for bookbinding").

In step S3406, the bookbinding application 104 outputs the size of the output paper and the drawing data whose imposition is performed for the text to the printer driver 106 via the electronic original despooler 105.

Note that the printer driver 106, based on the drawing data generated by the bookbinding application 104 and the command for the trimming processing, generates print data that can be interpreted by the printer.

With the processing described above, in the case where an offline finisher is not selected as the post-processing apparatus, the bookbinding application 104 generates a command for performing the trimming processing.

Accordingly, the printer can perform the processing according to the print data generated based on the command for performing the trimming processing, which is generated by the bookbinding application 104. Note that the print data generated by the bookbinding application 104 is data that can be interpreted by the printer.

The present invention can be implemented by directly or remotely supplying a program of software implementing functions of the above-described exemplary embodiments (in the exemplary embodiments, the program corresponding to the processing performed according to the flow charts in the drawings) to a system or an apparatus and reading and executing supplied program code with a computer of the system or the apparatus.

Accordingly, the program code itself, which is installed on the computer for implementing the functional processing of the present invention with the computer, implements the present invention. That is, the present invention also includes a computer program for implementing the functional processing of the present invention.

The program can be configured in any form, such as object code, a program executed by an interpreter, and script data supplied to an operating system (OS).

As the recording medium for supplying such program code, a floppy disk, a hard disk, an optical disk, a magneto-optical disk (MO), a compact disc-read-only memory (CD-ROM), a compact disc-recordable (CD-R), a compact disc-rewritable (CD-RW), a magnetic tape, a nonvolatile memory card, a read-only memory (ROM), and a digital versatile disc (DVD) (a DVD-ROM and a DVD-R), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk. The functions of the above-described embodiments can also be implemented by dividing the program code into a plurality of files and downloading each divided file from different web sites. That is, a world wide web (WWW) server for allowing a plurality of users to download the program file for implementing the functional processing configures the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Furthermore, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-102090 filed Apr. 3, 2006, which is hereby incorporated by reference herein in its entirety.

What is claimed is:

1. An information processing apparatus configured to generate a print job that can be interpreted by a printing apparatus and to have a bookbinding application, the information processing apparatus comprising:
    a print setting unit configured to set case binding printing;
    a first display unit configured to display a first alternative indicating a first layout type laying out page data of two pages on a front surface of a cover and page data of two pages on a back surface of the cover and a second alternative indicating a second cover layout type laying out page data of two pages on the front surface of the cover and page data of one page on the back surface of the cover as a cover layout type for the cover including a spine, wherein the cover layout type is not applied to an inside page that is wrapped by the cover, and the first and second alternatives are displayed in a screen provided by the bookbinding application;
    a first setting unit configured to select a single alternative from the first layout type and the second layout type;
    a second setting unit configured to set an inside page layout type for a sheet of the inside page;
    a selecting unit configured to select one position among a plurality of positions as a position of a spine area in the spine on which data for the spine is printed;
    a receiving unit configured to receive original data including page data to be printed;
    a deciding unit configured to decide page data to be laid out in a cover area, from among page data included in the original data received by the receiving unit, based on the single alternative selected by the first setting unit, wherein if the first alternative is selected, the page data of first, second, next to last and last pages included in the original data is decided as the page data to be laid out in the cover area, and if the second alternative is selected, the page data of first, second and last pages included in the original data is decided as the page data to be laid out in the cover area;
    a determination unit configured to determine whether the bookbinding application can support a selected printer driver;
    a second display unit configured to display a message indicating that the case book binding cannot be performed if the determination unit determines that the bookbinding application cannot support the selected printer driver, and
    a first generation unit configured to generate a print job such that page data decided by the deciding unit is printed on the sheet for the cover and the data for the spine is printed on the position in the spine selected by the selecting unit and page data that is not decided by the deciding unit is printed on the sheet of the inside page based on the inside page layout type,
    wherein the cover sheet is bigger than the sheet of the inside page if the determination unit determines that the bookbinding application can support the selected printer driver.

2. The information processing apparatus according to claim 1, further comprising:
    a second setting unit configured to set output format information;
    a calculation unit configured to calculate number of output sheets based on the page data included in the original data and the output format information set by the second setting unit; and
    a spine area size determination unit configured to determine a size of a spine area included in the cover area based on the number of output sheets calculated by the calculation unit and an output paper type included in the output format information,
    wherein the first generation unit performs layout processing on the cover area based on the page data determined by the determination unit and the determined size of the spine area.

3. The information processing apparatus according to claim 2, wherein the spine area includes a plurality of areas in which one of text data or image data is to be drawn, and
    wherein the information processing apparatus further comprises a drawing unit configured to draw one of text data or image data in a selected drawing area of the spine area.

4. The information processing apparatus according to claim 3, wherein the drawing unit is configured to change a position of the drawing area according to a variation in the determined size of the spine area.

5. The information processing apparatus according to claim 1, further comprising:
    a second generation unit configured to generate print data for bookbinding including data for a cover whose layout in the cover area is determined by the first generation unit; and
    an output unit configured to output the print data for bookbinding generated by the second generation unit to a printer driver so as to cause the printer driver to generate a print job that can be interpreted by the printing apparatus based on the print data for bookbinding.

6. A method for an information processing apparatus capable of generating a print job that can be interpreted by a printing apparatus and to have a bookbinding application, the method comprising:

setting case binding printing;

displaying a first alternative indicating a first layout type laying out page data of two pages on a front surface of a cover and page data of two pages on a back surface of the cover and a second alternative indicating a second cover layout type laying out page data of two pages on the front surface of the cover and page data of one page on the back surface of the cover as a cover layout type for the cover including a spine, wherein the cover layout type is not applied to an inside page that is wrapped by the cover, and the first and second alternatives are displayed in a screen provided by the bookbinding application;

select a single alternative from the first layout type and the second layout type;

setting an inside page layout type for a sheet of the inside page;

selecting one position among a plurality of positions as a position of a spine area in the spine on which data for the spine is printed;

receiving original data including page data to be printed;

deciding page data to be laid out in a cover area, from among page data included in the received original data, based on the number of pages to be laid out on the front surface of the cover and the number of pages to be laid out on the back surface of the cover of the selected cover layout type, wherein if the first layout type is selected, the page data of first, second, next to last and last pages included in the original data is decided as the page data to be laid out in the cover area, and if the second layout type is selected, the page data of first, second and last pages included in the original data is decided as the page data to be laid out in the cover area;

determining whether the bookbinding application can support a selected printer driver;

displaying a message indicating that the case book binding cannot be performed if the determination unit determines that the bookbinding application cannot support the selected printer driver; and generating a print job such that page data decided in the deciding step is printed on the sheet for the cover and the data for the spine is printed on the position in the spine selected in the position selecting step and page data that is not decided in the deciding step is printed on the sheet of the inside page based on the inside page layout type, wherein the cover sheet is bigger than the sheet of the inside page if it is determined in the determination step that the bookbinding application can support the selected printer driver.

7. The method according to claim 6, further comprising:

setting output format information;

calculating a number of output sheets based on the page data included in the original data and the set output format information;

determining a size of a spine area included in the cover area based on the calculated number of output sheets and an output paper type included in the output format information; and performing layout processing on the cover area based on the determined page data and the determined size of the spine area.

8. The method according to claim 7, wherein the spine area includes a plurality of areas in which one of text data or image data is to be drawn, and wherein the method further comprises drawing one of text data or image data in a selected drawing area of the spine area.

9. The method according to claim 8, further comprising changing a position of the drawing area according to a variation in the identified size of the spine area.

10. The method according to claim 6, further comprising:

generating print data for bookbinding including data for a cover whose layout in the cover area is determined; and outputting the generated print data for bookbinding to a printer driver so as to cause the printer driver to generate a print job that can be interpreted by the printing apparatus based on the print data for bookbinding.

11. A non-transitory computer-readable medium storing instructions which, when executed by an apparatus capable of generating a print job that can be interpreted by a printing apparatus and having a bookbinding application, causes the apparatus to perform operations comprising:

setting case binding printing;

displaying a first alternative indicating a first layout type laying out page data of two pages on a front surface of a cover and page data of two pages on a back surface of the cover and a second alternative indicating a second cover layout type laying out page data of two pages on the front surface of the cover and page data of one page on the back surface of the cover as a cover layout type for the cover including a spine, wherein the cover layout type is not applied to an inside page that is wrapped by the cover, and the first and second alternatives are displayed in a screen provided by the bookbinding application;

selecting a single alternative from the first layout type and the second layout type;

setting an inside page layout type for a sheet of the inside page;

selecting one position among a plurality of positions as a position of a spine area in the spine on which data for the spine is printed;

receiving original data including page data to be printed;

deciding page data to be laid out in a cover area, from among page data included in the received original data, based on the number of pages to be laid out on the front surface of the cover and the number of pages to be laid out on the back surface on the cover of the selected cover layout type for printing, wherein if the first layout type is selected, the page data of first, second, next to last and last pages included in the original data is decided as the page data to be laid out in the cover area, and if the second layout type is selected, the page data of first, second and last pages included in the original data is decided as the page data to be laid out in the cover area;

determining whether the bookbinding application can support a selected printer driver;

displaying a message indicating that the case book binding cannot be performed if the determination unit determines that the bookbinding application cannot support the selected printer driver; and generating a print job such that page data decided by the deciding step is printed on the sheet for the cover and the data for the spine is printed on the position in the spine selected in the position selecting step and page data that is not decided in the deciding step is printed on the sheet of the inside page based on the inside page layout type, wherein the cover sheet is bigger than the sheet of the inside page if it is determined in the determination step that the bookbinding application can support the selected printer driver.

12. The non-transitory computer-readable medium according to claim 11, wherein the operations further comprise:
setting output format information;
calculating number of output sheets based on the page data included in the original data and the set output format information;
determining a size of a spine area included in the cover area based on the calculated number of output sheets and an output paper type included in the output format information; and
performing layout processing on the cover area based on the determined page data and the determined size of the spine area.

13. The non-transitory computer-readable medium according to claim 12, wherein the spine area includes a plurality of areas in which one of text data or image data is to be drawn, and wherein the operations further comprise drawing one of text data or image data in a selected drawing area of the spine area.

14. The non-transitory computer-readable medium according to claim 13, wherein the operations further comprise changing a position of the drawing area according to a variation in the identified size of the spine area.

15. The non-transitory computer-readable medium according to claim 11, wherein the operations further comprise:
generating print data for bookbinding including data for a cover whose layout in the cover area is determined; and
outputting the generated print data for bookbinding to a printer driver so as to cause the printer driver to generate a print job that can be interpreted by the printing apparatus based on the print data for bookbinding.

* * * * *